US010452636B2

(12) United States Patent
Kim et al.

(10) Patent No.: US 10,452,636 B2
(45) Date of Patent: Oct. 22, 2019

(54) DELAYED SNAPSHOT ISOLATION FOR READ SERVICE AT A DATABASE

(71) Applicant: SAP SE, Walldorf (DE)

(72) Inventors: Kyu Hwan Kim, Seoul (KR); Juchang Lee, Seoul (KR); Beomsoo Kim, Seoul (KR); Chang Gyoo Park, Gwanak-gu (KR); Reiner Singer, Schriesheim (DE); Christoph Rottering, Sinsheim (DE); Werner Thesing, Lauteral (DE); Michael Muehle, Walldorf (DE)

(73) Assignee: SAP SE, Walldorf (DE)

( * ) Notice: Subject to any disclaimer, the term of this patent is extended or adjusted under 35 U.S.C. 154(b) by 396 days.

(21) Appl. No.: 15/361,760

(22) Filed: Nov. 28, 2016

(65) Prior Publication Data

US 2018/0150496 A1 May 31, 2018

(51) Int. Cl.

| | |
|---|---|
| ***G06F 16/00*** | (2019.01) |
| ***G06F 16/23*** | (2019.01) |
| ***G06F 16/245*** | (2019.01) |
| ***G06F 16/27*** | (2019.01) |

(52) U.S. Cl.

CPC ...... *G06F 16/2322* (2019.01); *G06F 16/2365* (2019.01); *G06F 16/2379* (2019.01); *G06F 16/2386* (2019.01); *G06F 16/245* (2019.01); *G06F 16/27* (2019.01); *G06F 16/273* (2019.01)

(58) Field of Classification Search

CPC ............. G06F 16/2322; G06F 16/2379; G06F 16/2386; G06F 16/27; G06F 16/273; G06F 16/2365; G06F 16/245

See application file for complete search history.

(56) References Cited

U.S. PATENT DOCUMENTS

| | | | | |
|---|---|---|---|---|
| 2006/0190497 A1* | 8/2006 | Inturi | G06F 16/256 | |
| 2013/0117236 A1* | 5/2013 | Schreter | G06F 11/1402 | 707/682 |
| 2013/0124475 A1* | 5/2013 | Hildenbrand | G06F 16/2315 | 707/636 |
| 2013/0304714 A1* | 11/2013 | Lee | G06F 16/2365 | 707/703 |
| 2015/0199415 A1* | 7/2015 | Bourbonnais | G06F 16/273 | 707/615 |

* cited by examiner

*Primary Examiner* — Alexander Khong

(74) *Attorney, Agent, or Firm* — Jones Day

(57) ABSTRACT

A computer implemented method is provided comprising receiving a group of transaction logs from a first database, allocating transaction logs from the group of transaction logs to a first queue and to a second queue, generating an end-of-group transaction log indicative of an end of the group of transaction logs, allocating the end-of-group log to the first queue and the second queue; replaying transaction logs from the first queue including the end-of-group transaction log allocated to the first queue, replaying transaction logs from the second queue including the end-of-group transaction log allocated to the second queue; and changing visibility of one or more transactions in response to replaying the end-of-group transaction log allocated to the first queue and the end-of-group transaction log allocated to the second queue. Related apparatus, systems, techniques and articles are also described.

21 Claims, 15 Drawing Sheets

Interim-system timestamp updated, e.g. IST(7) 2105

T1 redo2 replayed 2110

T1pCID(8) added to precommit record 2120

T1 precommit log replayed 2115

T2 redo2 replayed 2125

T2pCID(9) added to precommit record 2135

T2 precommit log replayed 2130

Interim-system timestamp updated to T2CID(12) 2150

T2pCID(9) removed from precommit record 2145

T2 commit log replayed 2140

Update system timestamp as min(*interim-system timestamp, smallest precommitID on precommit record*)= T1pCID(8) 2160

End-of-group log replayed by all parallel queues 2155

Interim-system timestamp remains T2CID(12)>T1CID(10) 2175

T1pCID(8) removed from precommit record 2170

T1 commit log replayed 2165

Time

Next end-of-chunk reached by all parallel queues 2180

Update system timestamp as min(*interim-system timestamp, smallest precommitID on precommit record*)= T2CID(12) 2185

2100

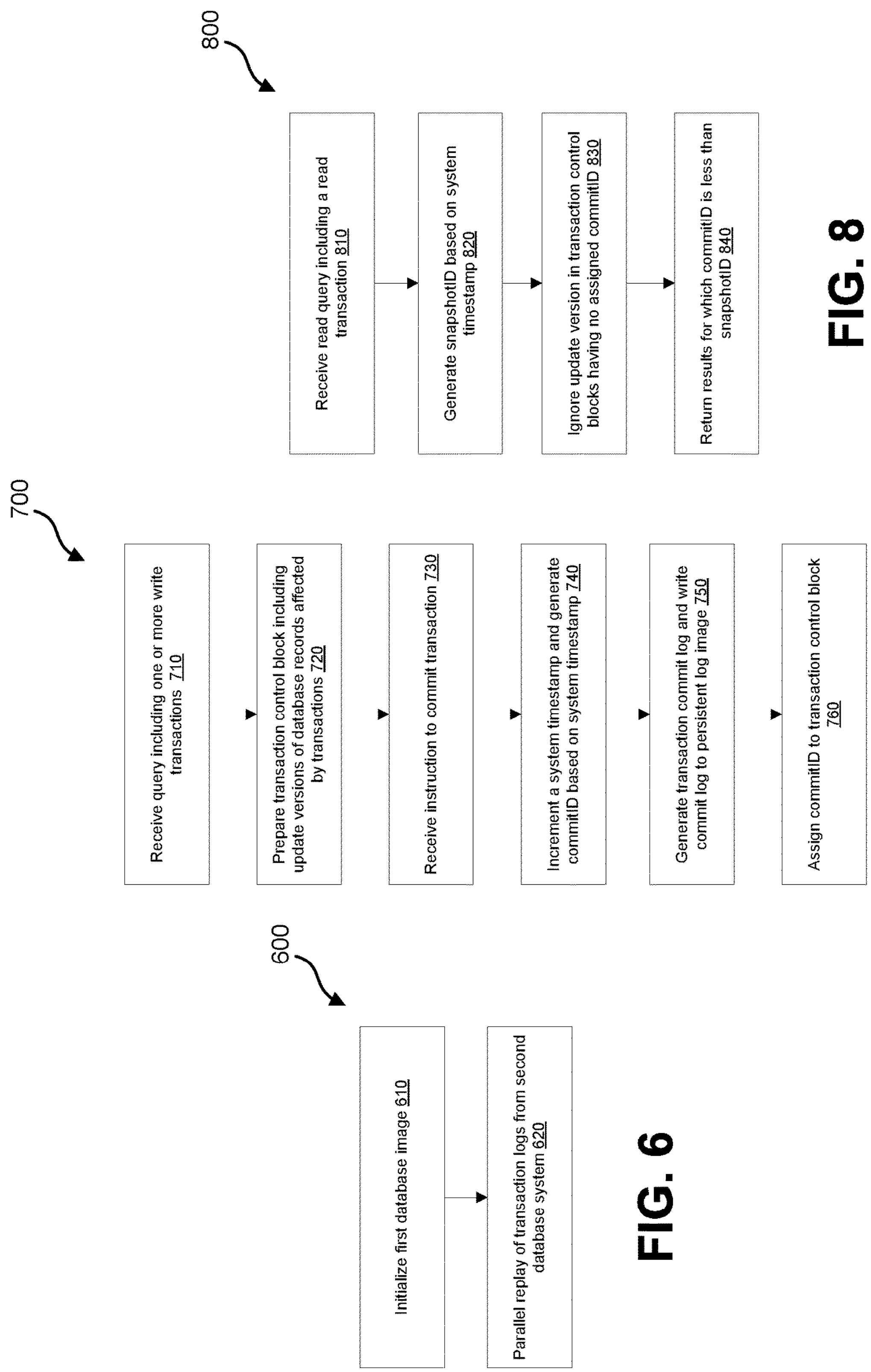
600
Initialize first database image 610
Parallel replay of transaction logs from second database system 620
FIG. 6
700
Receive query including one or more write transactions 710
Prepare transaction control block including update versions of database records affected by transactions 720
Receive instruction to commit transaction 730
Increment a system timestamp and generate commitID based on system timestamp 740
Generate transaction commit log and write commit log to persistent log image 750
Assign commitID to transaction control block 760
FIG. 7
800
Receive read query including a read transaction 810
Generate snapshotID based on system timestamp 820
Ignore update version in transaction control blocks having no assigned commitID 830
Return results for which commitID is less than snapshotID 840
FIG. 8

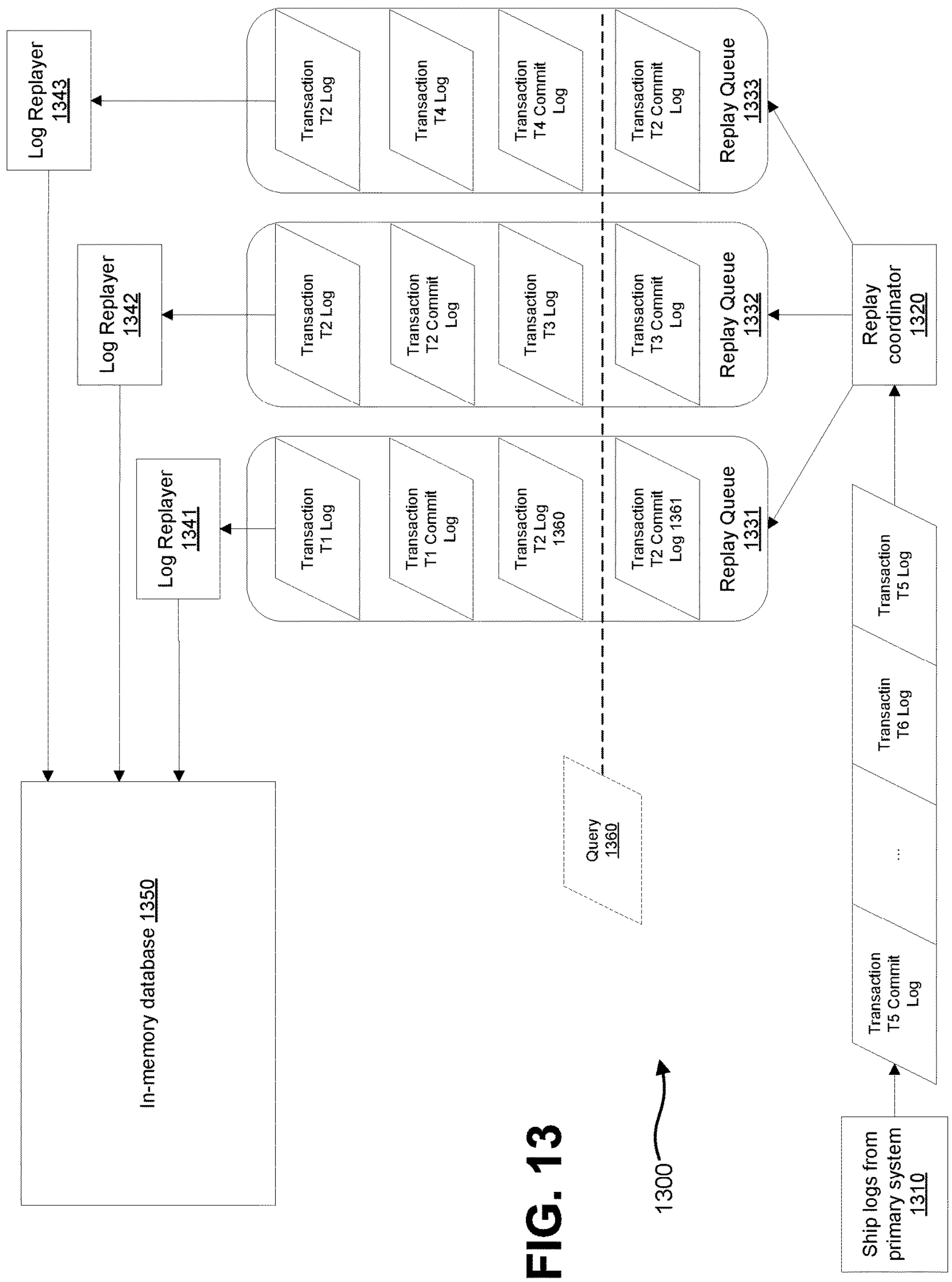

Log Replayer 1343
Log Replayer 1342
Log Replayer 1341
Transaction T2 Log
Transaction T4 Log
Transaction T4 Commit Log
Transaction T2 Commit Log
Replay Queue 1333
Transaction T2 Log
Transaction T2 Commit Log
Transaction T3 Log
Transaction T3 Commit Log
Replay Queue 1332
Transaction T1 Log
Transaction T1 Commit Log
Transaction T2 Log 1360
Transaction T2 Commit Log 1361
Replay Queue 1331
Replay coordinator 1320
Transaction T5 Log
Transactin T6 Log
...
Transaction T5 Commit Log
Ship logs from primary system 1310
Query 1360
In-memory database 1350
FIG. 13
1300

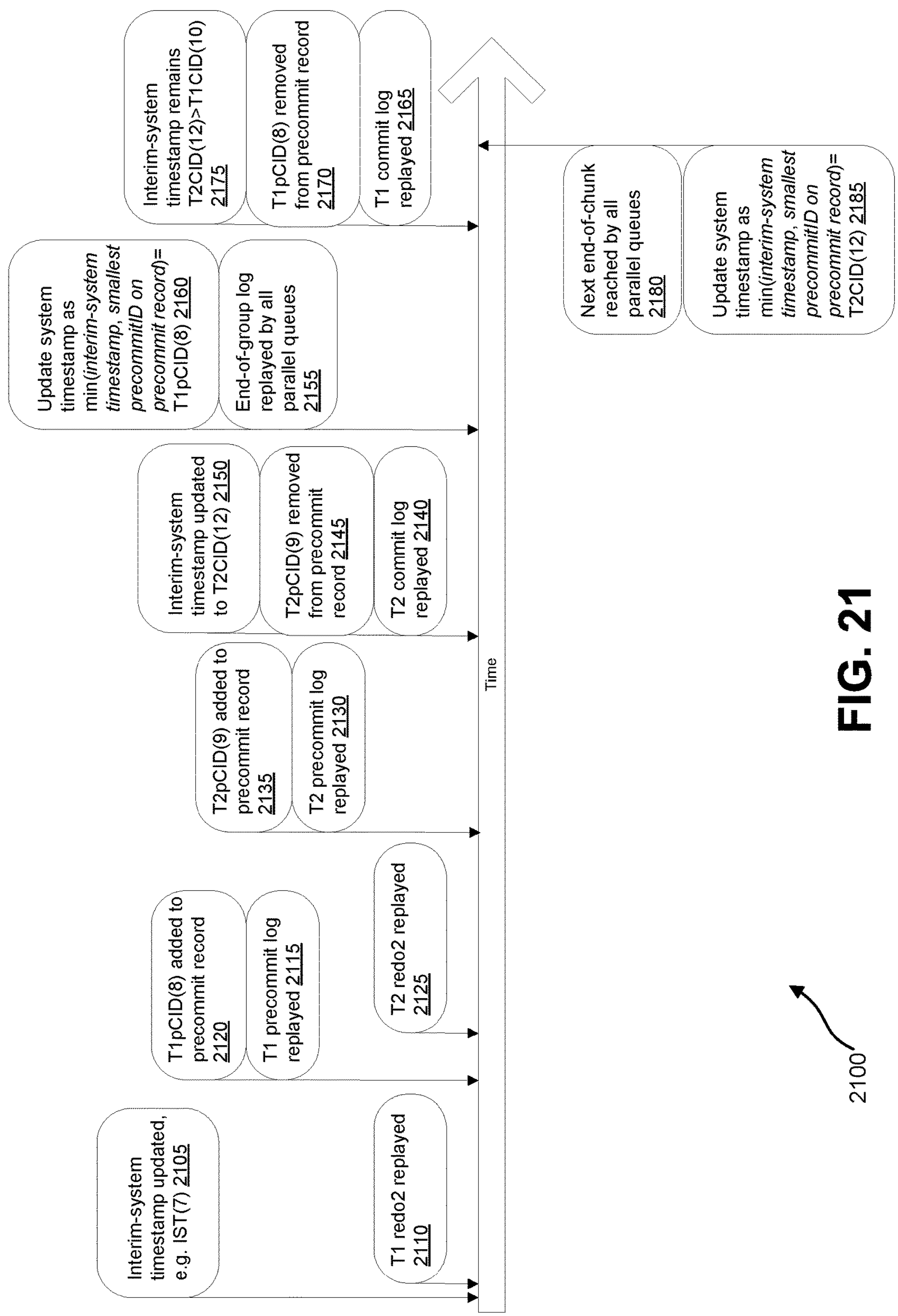
Interim-system timestamp updated, e.g. IST(7) 2105
T1 redo2 replayed 2110
T1pCID(8) added to precommit record 2120
T1 precommit log replayed 2115
T2 redo2 replayed 2125
T2pCID(9) added to precommit record 2135
T2 precommit log replayed 2130
Interim-system timestamp updated to T2CID(12) 2150
T2pCID(9) removed from precommit record 2145
T2 commit log replayed 2140
Update system timestamp as min(interim-system timestamp, smallest precommitID on precommit record)= T1pCID(8) 2160
End-of-group log replayed by all parallel queues 2155
Interim-system timestamp remains T2CID(12)>T1CID(10) 2175
T1pCID(8) removed from precommit record 2170
T1 commit log replayed 2165
Next end-of-chunk reached by all parallel queues 2180
Update system timestamp as min(interim-system timestamp, smallest precommitID on precommit record)= T2CID(12) 2185
Time
FIG. 21
2100

DELAYED SNAPSHOT ISOLATION FOR READ SERVICE AT A DATABASE

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

A computer implemented method is provided. The method comprises receiving a first group of transaction logs from a first database, allocating transaction logs from the first group of transaction logs to a first queue, allocating transaction logs from the first group of transaction logs to a second queue, generating an end-of-group transaction log indicative of an end of the first group of transaction logs, allocating the end-of-group log to the first queue and the second queue; replaying transaction logs from the first queue including the end-of-group transaction log allocated to the first queue, replaying transaction logs from the second queue including the end-of-group transaction log allocated to the second queue; and changing visibility of one or more transactions in response to replaying the end-of-group transaction log allocated to the first queue and the end-of-group transaction log allocated to the second queue.

These aspects and other embodiments may include one or more of the following features. The first group of transaction logs comprises a redo log containing data describing one or more write transactions executed in the first database, a pre-commit log containing data comprising one or more pre-commit time stamps assigned to the one or more write transactions, a commit log containing data comprising a commit timestamp indicating when at least one of the one or more transactions was committed to the first database. Replaying a pre-commit log causes at least one pre-commit timestamp to be recorded in a pre-commit timestamp record. Replaying a commit log causes at least one associated pre-commit timestamp to be removed from the pre-commit timestamp record; and, when a commit timestamp of the commit log is greater than an interim-system timestamp, replaying a commit log causes updating the interim-system timestamp with the commit timestamp.

The method may further include changing visibility of one or more transactions includes updating a system timestamp to match the lower of a lowest pre-commit timestamp recorded in the pre-commit timestamp record and the interim-system timestamp. The method may further include receiving a query and returning only visible database records, wherein visible database records have an associated commit timestamp less than or equal to the system timestamp. The method may also include that one or more transaction logs are allocated according to an allocation policy based on one or more tables affected by the replay of each respective log. Receiving a second group of transaction logs; and, after allocating the end-of-group log to the first queue and the second queue allocating one or more transaction logs from the second group of transaction logs to a first queue, and allocating one or more transaction logs from the second group of transaction logs to a second queue, and generating a second end-of-group transaction log indicative of an end of the second group of transaction logs, and allocating the second end-of-group log to the first queue and the second queue.

In other embodiments a non-transitory computer readable storage medium embodying programming instruction for performing a method is provided. The method comprises receiving a first group of transaction logs from a first database, allocating transaction logs from the first group of transaction logs to a first queue, allocating transaction logs from the first group of transaction logs to a second queue, generating an end-of-group transaction log indicative of an end of the first group of transaction logs; allocating the end-of-group log to the first queue and the second queue, replaying transaction logs from the first queue including the end-of-group transaction log allocated to the first queue, replaying transaction logs from the second queue including the end-of-group transaction log allocated to the second queue; and changing visibility of one or more transactions in response to replaying the end-of-group transaction log allocated to the first queue and the end-of-group transaction log allocated to the second queue.

These aspects and other embodiments may include one or more of the following features. The first group of transaction logs comprises a redo log containing data describing one or more write transactions executed in the first database, a pre-commit log containing data comprising one or more pre-commit time stamps assigned to the one or more write transactions, a commit log containing data comprising a commit timestamp indicating when at least one of the one or more transactions was committed to the first database. Replaying a pre-commit log causes at least one pre-commit timestamp to be recorded in a pre-commit timestamp record. Replaying a commit log causes at least one associated pre-commit timestamp to be removed from the pre-commit timestamp record; and, when a commit timestamp of the commit log is greater than an interim-system timestamp, replaying a commit log causes updating the interim-system timestamp with the commit timestamp.

The method provided by the programming instructions embodied in the non-transitory computer readable storage medium may further comprise changing visibility of one or more transactions includes updating a system timestamp to match the lower of a lowest pre-commit timestamp recorded in the pre-commit timestamp record and the interim-system timestamp. The method provided by the programming instructions embodied in the non-transitory computer readable storage medium may further comprise receiving a query and returning only visible database records, wherein visible database records have an associated commit timestamp less than or equal to the system timestamp. The method provided by the programming instructions embodied in the non-transitory computer readable storage medium may further comprise that one or more transaction logs are allocated according to an allocation policy based on one or more tables affected by the replay of each respective log. Receiving a second group of transaction logs; and, after allocating the end-of-group log to the first queue and the second queue allocating one or more transaction logs from the second group of transaction logs to a first queue, and allocating one or more transaction logs from the second group of transaction logs to a second queue, and generating a second end-of-group transaction log indicative of an end of the second group of transaction logs, and allocating the second end-of-group log to the first queue and the second queue.

In other embodiments a computer system is provided. The computer system is configured by programming instructions, executable on the computer system, to cause the one or more processors to receive a first group of transaction logs from a first database, allocate transaction logs from the first group of transaction logs to a first queue, allocate transaction logs from the first group of transaction logs to a second queue, generate an end-of-group transaction log indicative of an end of the first group of transaction logs, allocate the end-of-group log to the first queue and the second queue, replay transaction logs from the first queue including the end-of-group transaction log allocated to the first queue, replay transaction logs from the second queue including the end-of-group transaction log allocated to the second queue; and change visibility of one or more transactions in response to replaying the end-of-group transaction log allocated to the first queue and the end-of-group transaction log allocated to the second queue.

These aspects and other embodiments may include one or more of the following features. The first group of transaction logs comprises a redo log containing data describing one or more write transactions executed in the first database, a pre-commit log containing data comprising one or more pre-commit time stamps assigned to the one or more write transactions, a commit log containing data comprising a commit timestamp indicating when at least one of the one or more transactions was committed to the first database. Replaying a pre-commit log causes at least one pre-commit timestamp to be recorded in a pre-commit timestamp record. Replaying a commit log causes at least one associated pre-commit timestamp to be removed from the pre-commit timestamp record; and, when a commit timestamp of the commit log is greater than an interim-system timestamp, replaying a commit log causes updating the interim-system timestamp with the commit timestamp.

The computer system may be further configured by programming instructions, executable on the computer system, to cause the one or more processors to change visibility of one or more transactions including updating a system timestamp to match the lower of a lowest pre-commit timestamp recorded in the pre-commit timestamp record and the interim-system timestamp. The method provided by the programming instructions embodied in the non-transitory computer readable storage medium may further comprise receiving a query and returning only visible database records, wherein visible database records have an associated commit timestamp less than or equal to the system timestamp. The computer system may further be configured by programming instructions, executable on the computer system, to provide that one or more transaction logs are allocated according to an allocation policy based on one or more tables affected by the replay of each respective log. The computer system may further be configured by programming instructions, executable on the computer system, to receive a second group of transaction logs; and, after allocating the end-of-group log to the first queue and the second queue allocating one or more transaction logs from the second group of transaction logs to a first queue, and allocating one or more transaction logs from the second group of transaction logs to a second queue, and generating a second end-of-group transaction log indicative of an end of the second group of transaction logs, and allocating the second end-of-group log to the first queue and the second queue.

In various other embodiments a system, non-transitory medium, and a computer implemented method are provided, that include receiving a query at a second database, where the second database is populated with records replicated from a first database by group-wise parallel replaying of transaction logs of the first database. The transaction logs including pre-commit logs that includes a timestamp of an associated transaction; redo logs including the transaction details of a transaction; and commit logs including a commit timestamp associated with a respective associated transaction. A snapshot identification is assigned to the query, such that the snapshot identification is associated with a current secondary global commit timestamp, and where the current secondary global commit timestamp is set by the group-wise replaying of transaction logs such that the secondary global commit timestamp is updated at an end of each respective group of logs replayed based on the lesser of: the lowest pre-commit timestamp associated with any transaction for which an associated commit log has not been replayed; and the largest commit timestamp associated with any transaction for which an associated commit log has been replayed. A response to the query is generated including only records of the second database having an associated commit timestamp less than snapshot identification.

In various other embodiments a system, non-transitory medium, and a computer implemented method are provided, that include populating a first database by the parallel replay of transaction logs from a second database by a plurality of log replayers; responding to a query executed on the first database with a first record associated with a transaction that has been committed in the first database by the replay of a first commit log, and all additional responsive records that were committed to the second database before the first record was committed to the second database, wherein a responsive record is any record responsive to the query.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may provide increased average throughput for a database system during high workloads by enabling effective load balancing techniques for balancing the workload of a primary system with a backup database system. Enabling accelerated replay of transaction logs at the secondary database by the parallel replay, or parallel processing, of transaction logs, a backup database system may be maintained in a near current state with respect to a primary system that is under continuous use by one or more applications or users. Enabling parallel replay of transaction logs at a backup systems further enables full utilization of the processing capabilities of a multi-core processing system or a multiprocessor system or a distributed system. Fully utilizing available processing capabilities by parallel replay of transaction logs ensures that the log reply speed at the backup system can sustain the pace of log generation speed of a primary system under write-intensive workloads. By enabling consistent transactional visibility of transactions that are replicated from a primary database by parallel replay of transaction logs without strictly ordering transaction replay allows the secondary database to quickly replicate transactions while also providing consistent responses to read queries allocated to the backup system through a load balancing scheme. Without consistent transactional visibility, parallel log replay will result in inconsistent returns in response to a query. The subject matter described herein allows consistent data visibility in a secondary database while data is updated and table structures are modified during transaction execution.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is a flow chart depicting exemplary operation of a system or method for parallel replay of transaction logs by a database for use in connection with the current subject matter.

FIG. 7 is a flow chart depicting exemplary operations of a system or method executing a write transaction upon a database for use in connection with the current subject matter.

FIG. 8 is a flow chart depicting exemplary operations of a system or method executing a read transaction upon a database for use in connection with the current subject matter.

FIG. 13 is a functional flow diagram illustrating parallel log replay in accordance with one or more embodiments described herein.

FIG. 21 illustrates a timeline of events caused by parallel replay of transaction logs in accordance with one or more embodiments described herein.

Like reference symbols in the various drawings indicate like elements.

DETAILED DESCRIPTION

Figure 1:
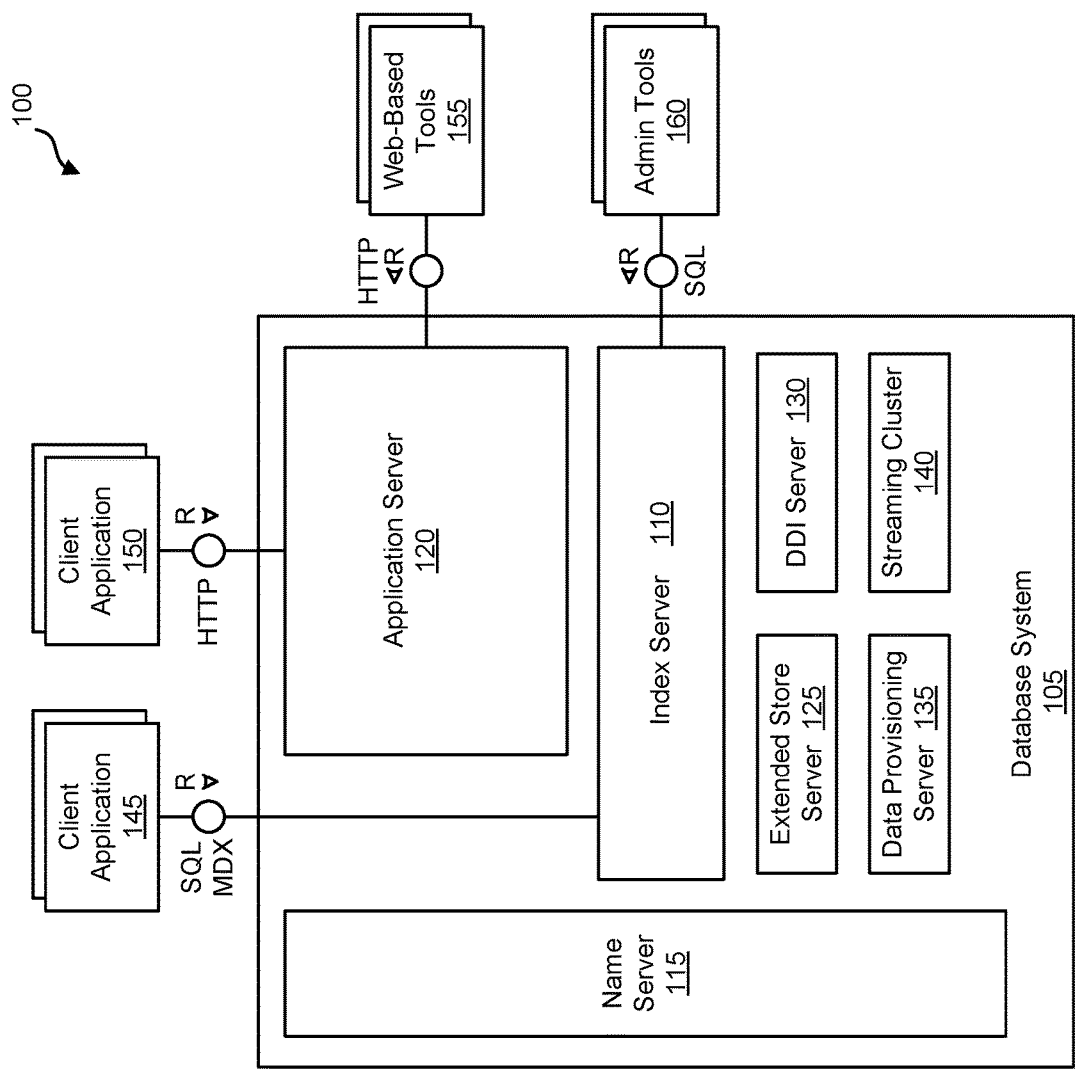
FIG. 1 is a system diagram illustrating an example database system for use in connection with the current subject matter.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (backup) copy of the data associated with the database. In some implementations, the database may include more than two datacenters (e.g., three or four datacenters)

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the load between the two systems. Such a situation may be referred to as Active/Active (AA) operation since the first datacenter and the second datacenter both actively respond to queries at the same time.

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup database systems to execute queries to reduce the workload of a primary database system.

When a secondary, or backup, database system serves the purpose of HA/DR functionality, an apparatus, system, technique or article that utilizes a secondary, backup database system to increase throughput of a workload on a primary database system should not interfere with the HA/DR functionality of the backup system. The use of the backup database system to increase throughput should also maintain the backup database in substantially the same state as the primary database. In the event of primary database system failure, the backup database can assume the role of the primary database in as little time as possible. Therefore, transactions replicated to the secondary database should be as close to current as possible. But, under heavy write-intensive workloads, replay of transactions executed in the primary by replay of transaction logs may significantly lag behind the write transaction log generation of the primary system. Therefore, it is desirable to accelerate transaction log replay by a backup database system. Also, in order enable functional load balancing, queries executed upon the backup database should return consistent results. Thus, techniques for accelerating transaction log reply by a backup database should be implemented in a way that allows the backup system to provide consistent returns.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
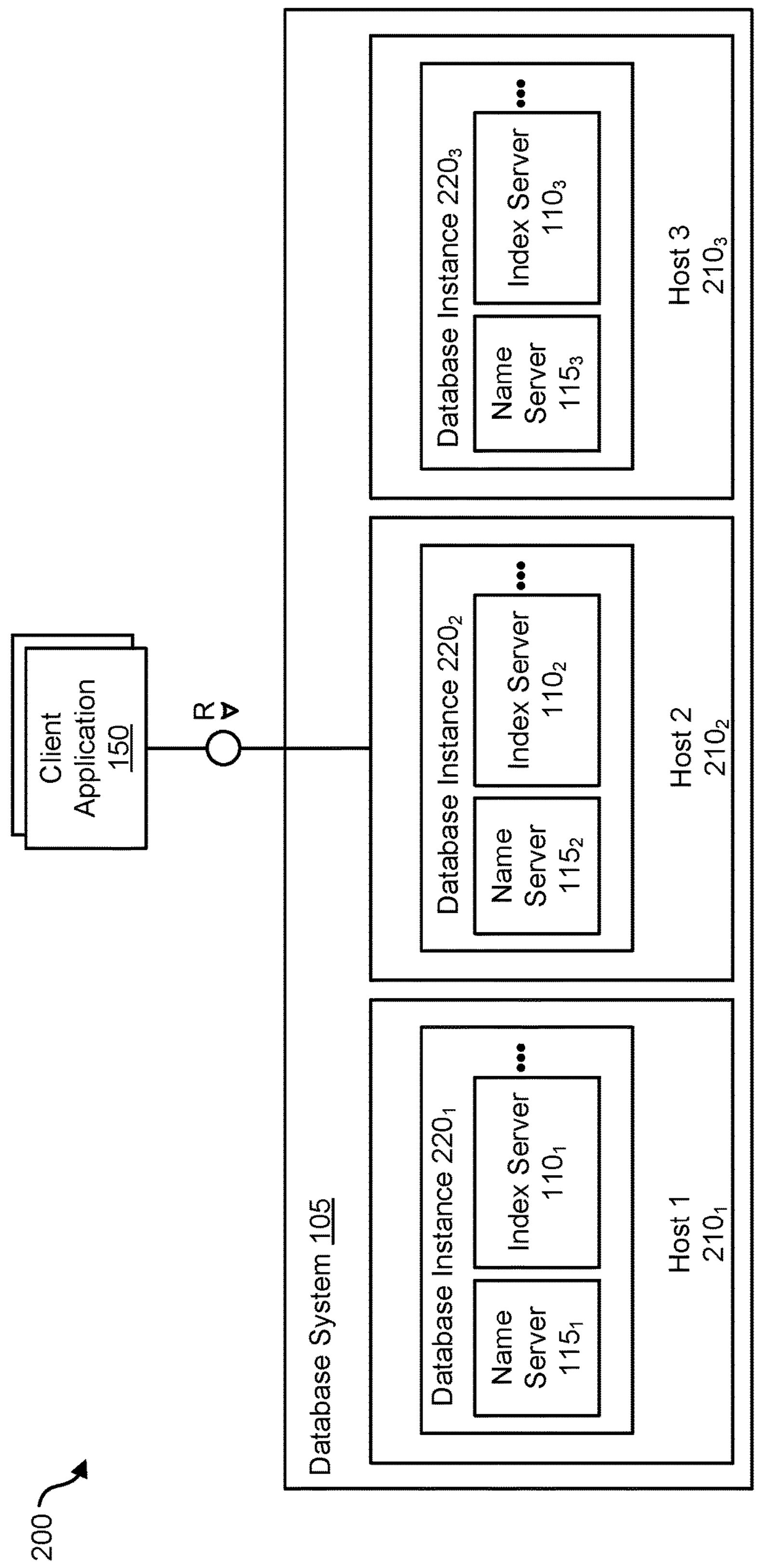
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $\mathbf{110}_{1\text{-}3}$, $\mathbf{120}_{1\text{-}3}$, in the system, if required.

As is illustrated in FIG. 2, the distributed database system 105 can be installed on more than one host $\mathbf{210}_{1\text{-}3}$. Each host $\mathbf{210}_{1\text{-}3}$ is a machine that can comprise at least one data processor (e.g., a CPU, etc.), memory, storage, a network interface, and an operation system and which executes part of the database system 105. Each host $\mathbf{210}_{1\text{-}3}$ can execute a database instance $\mathbf{220}_{1\text{-}3}$ which comprises the set of components of the distributed database system 105 that are installed on one host $\mathbf{210}_{1\text{-}3}$. FIG. 2 shows a distributed system with three hosts, which each run a name server $\mathbf{110}_{1\text{-}3}$, index server $\mathbf{120}_{1\text{-}3}$, and so on (other components are omitted to simplify the illustration).

Figure 3:
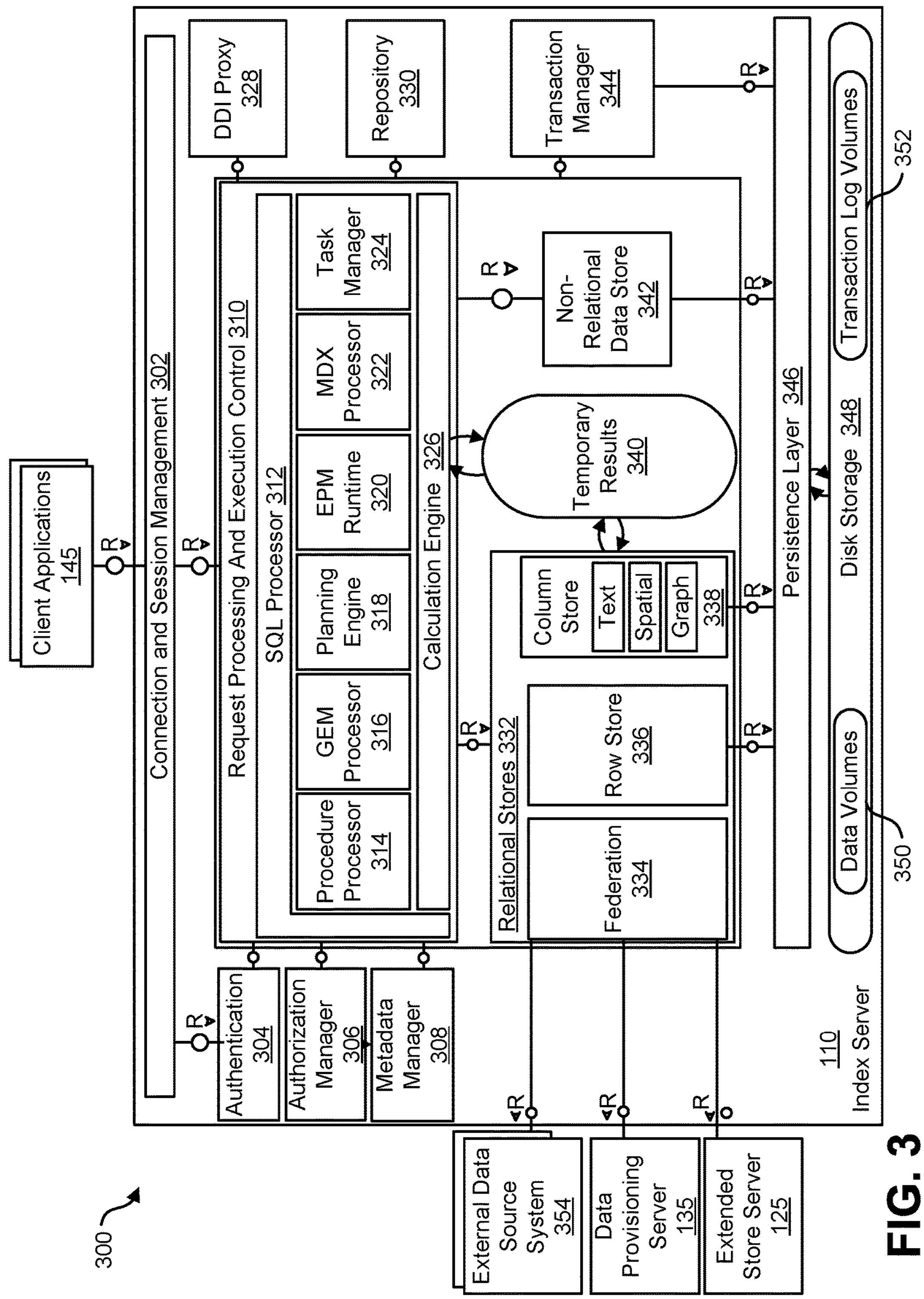
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It may be the case with certain data systems supporting critical functions of an organization that both load balancing and HA systems are necessary to efficiently support continuous operations. Thus, it may be desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, and potentially distributing certain non-essential tasks to a tertiary system.

Figure 4:
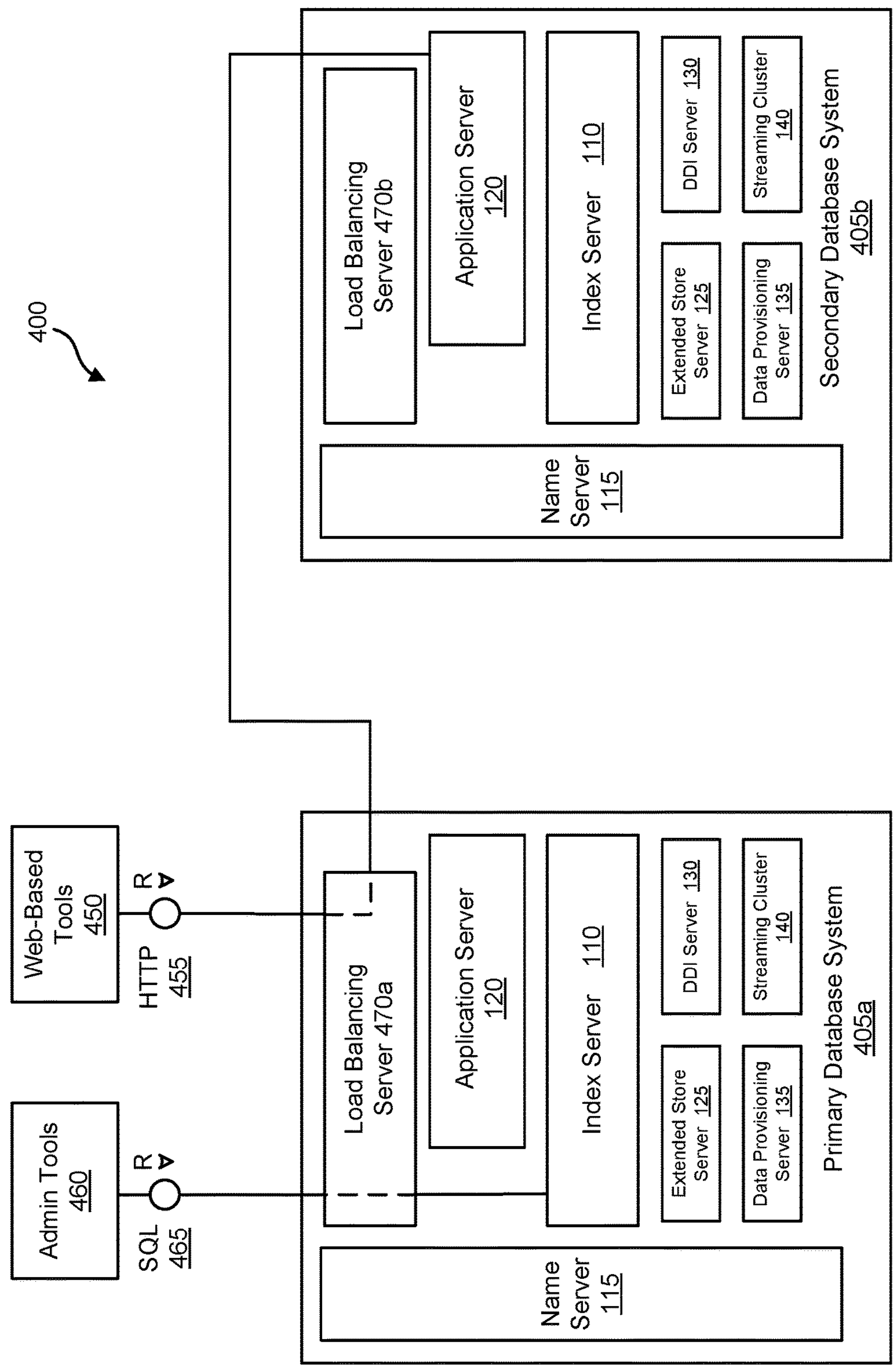
FIG. 4 is a functional flow diagram illustrating an architecture to support load balancing between a primary database system and a secondary database system, which serves as hot-standby to the primary database system, for use in connection with the current subject matter.

FIG. 4 is a functional flow diagram illustrating an architecture 400 to support load balancing between a primary database system, or primary system 405*a* and a secondary database system, or secondary system 405*b*, which serves as hot-standby to primary system 405*a*. Each of the primary system 405*a* and the secondary system 405*b* may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405*a* and secondary system 405*b* may include a load balancing functionality. Such load balancing functionality may for example be contained within a distinct load balancing server 470*a* or 470*b*. But, such load balancing functionality may be managed by any suitable processing system. For example, the application server 120 of the primary system may also manage the load balancing of requests issued to the application server of the primary system 405*a*, sending requests to the secondary system 405*b* as necessary to maintain a well distributed workload.

As depicted in FIG. 4, each of the primary system 405*a* and the secondary system 405*b* includes a load balancing server 470*a* and 470*b* which respectively receive requests from user applications directed to the primary system 405*a* or the secondary system 405*b*. Such request may come from either admin tools 460 or web-based tools 450, or any other user application. Upon receiving a request a load balancing server, e.g. 470*a*, determines how to distribute the workload. As depicted load balancing server 470*a* routes an SQL request 465 from admin tools 460 to the index server 110 of the primary system 405*a*, while routing an HTTP request 455 from web-based tools 450 to the application server 120 of the secondary system 405*b*.

Load balancing of resources between a primary system 405*a* and a secondary system 405*b* can give rise to a number of complicating issues. For example, if either of the requests 455, 465 requires writing to one or more data tables, or modifying a data table, then the two systems 405*a*, 405*b* will diverge. After many instances of write requests being distributed between the primary system 405*a* and the secondary system 405*b*, the two systems would be substantially different, and likely unusable. In another example, an application request, e.g. 465, may perform a write transaction that is followed by a read transaction, e.g. 455, related to the data written by the write request 465. If the write request is allocated to the primary system 405*a*, the read request would obtain a different result depending on whether the subsequent read transaction is carried out by the primary system 405*a* or by the secondary system 405*b*.

Load balancing in a HA/DR system, by distributing a portion of the workload of a primary data system to a hot-standby or backup system should be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or substantially identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
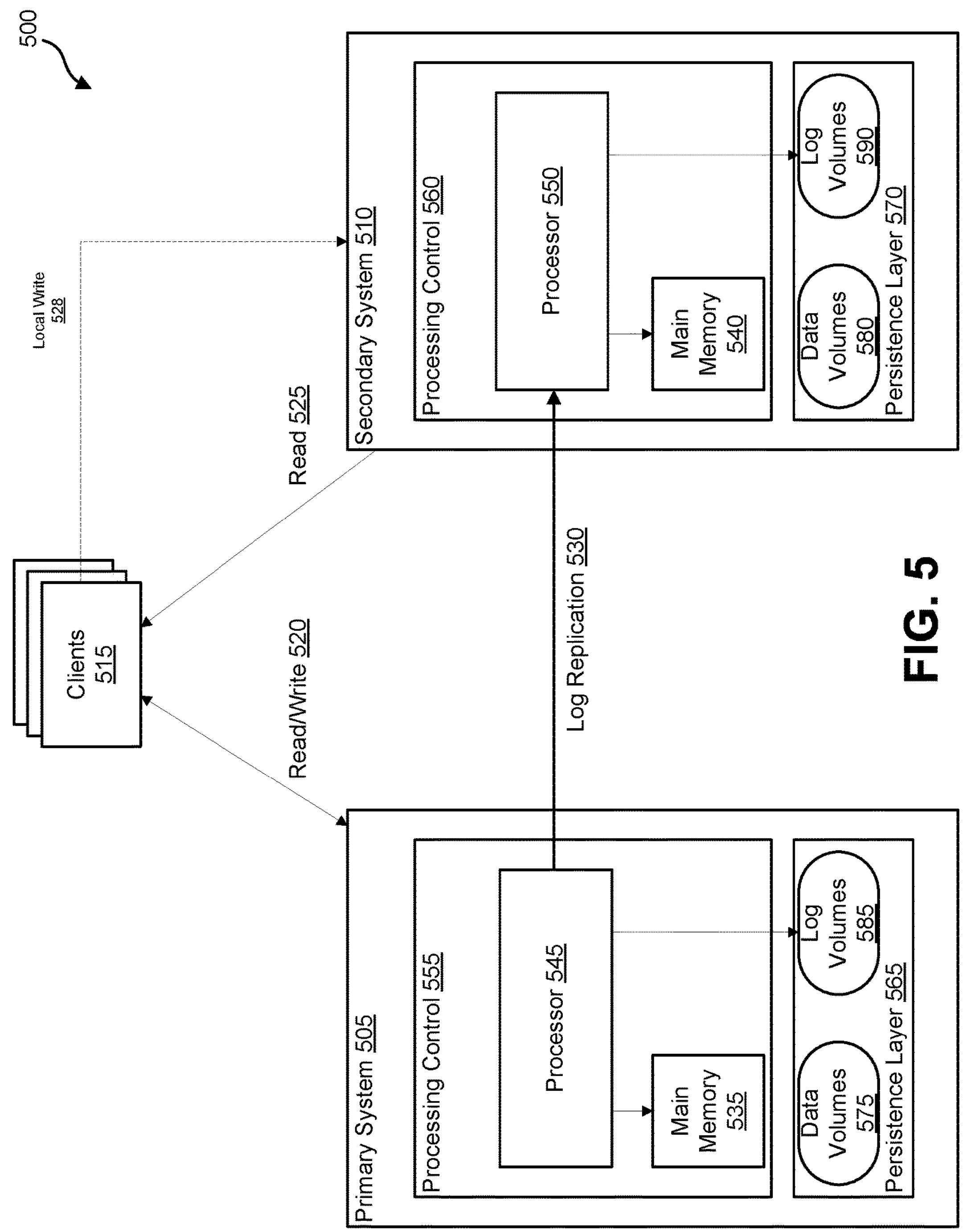
FIG. 5 is a functional flow diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while the secondary system 510 itself prohibits execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 505 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that it is available upon restart or recovery.

Primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places actively used data in main memory, and also persists any data committed in the primary system to persistence layer 570 to be stored by data volumes 580. Replay of the transaction logs at the secondary system 510 also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that a secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510. These are just a few of the issues to be addressed in order to provide a robust load balancing implementation in a HA/DR architecture, where the hot-standby system also functions to carry a portion of the workload. One or more solutions to issues arising by the load balancing solution depicted in FIG. 5 are now addressed.

As discussed above, when a secondary, or backup, database system serves the purpose of HA/DR functionality, an apparatus, system, technique or article that utilizes a secondary, backup database system to increase throughput of a workload on a primary database system should not interfere with the HA/DR functionality of the backup system. The use of the backup database system to increase throughput should also maintain the backup database in substantially the same state as the primary database. In the event of primary database system failure, the backup database can assume the role of the primary database in as little time as possible. Therefore, transactions replicated to the secondary database should be as close to current as possible. But, under heavy write-intensive workloads, replay of transactions executed in the primary by replay of transaction logs may significantly lag behind the write transaction log generation of the primary system. Therefore, it is desirable to accelerate transaction log replay by a backup database system. Also, in order enable functional load balancing, queries executed upon the backup database should return consistent results. Thus, techniques for accelerating transaction log reply by a backup database should be implemented in a way that allows the backup system to provide consistent returns.

FIG. 6 is a flow chart 600 depicting exemplary operation of a system or method for parallel replay of transaction logs by a database for use in connection with the current subject matter. In operation 610, the database system initializes a first database image. The first database image may be an image held in memory, for example, in main memory 540. The first database image may be an image of a database, such that the image held in main memory may be an in-memory database. The database system initializes the first database image based on one or more images held in a persistent layer, for example persistence layer 570. The first database image may be initialized based on data from a data image, which may be maintained in a persistent data volume, for example data volume 580. The first database image may further be initialized based on one or more log records maintained in a persistent log volume, for example log volume 590.

Upon, or after, initialization of the first database image, the database system may operate as a backup system to a primary database system, for example primary system 405*a* or 505. As a backup system, the database system may primarily function as a HA/DR system, but may also accept queries in order to reduce a workload on the primary system. In order to serve as a backup system, and as a load balancing system, one or more processes executing on one or more processors, for example processor 550, operate to maintain the backup system in a state as close as possible to the state of the primary system. In order to perform its HA/DR, and to be useful for critical operations, the backup system should be in a near current state with regard to the primary system, meaning that transactions executed and committed to the primary database should be reflected in the secondary database as soon as possible. But, in one or more embodiments it is operationally sufficient that the backup database be substantially close to the current state of the primary database, so long as the backup system remains in a consistent state.

A consistent state is one in which a query on the secondary system will not return partial results from a transaction executed on the primary system. In other words, if part of a transaction is visible to a query made by a write transaction, then all other changes caused by that transaction should be visible to the query—this is referred to as visibility atomicity. A consistent state is also one in which when the results of a transaction are initially visible to a query, the same transaction results will be visible to the query until the query finishes. Likewise, once a query could not read a transaction's results, those results should remain invisible to the query until the query finishes—this is referred to as visibility stability. A consistent state is further one in which results from a second transaction executed upon the primary system after a first transaction will not be visible to a query on the backup database if the first transaction is not also visible, and once a transactions results are visible to a first query, they should remain visible to a later executed query. In other words, if a second transaction is committed after a first transaction is committed, and the second transaction's results are visible to a query, the first transaction's results should also be visible to the query—this is referred to as visibility monotonicity.

In one or more embodiments, to cause the state of the backup database system to mirrors the state of the primary database system, at operation 620 one or more processors 550 of the backup system continuously receive and replay transaction logs generated by the primary system in parallel. That is, transaction logs may be allocated to a plurality of queues, and one or more processes executing on one or more processors cause one or more processors to replay the transaction logs. To further accelerate the replay of transaction logs, the transaction logs may be allocated to the reply queues in a way that allows replay of transaction logs without regard for the ordering of transaction logs in different queues. For example, transaction logs may be allocated to particular queues based on which table, or database record, is updated.

Parallel replay continues while transactions are executed upon the primary database system and replicated to the backup system by log replication 530. These transaction logs may be, for example, redo logs which contain a record of changes or updates made to one or more database records. These transaction logs may also include commit logs, which cause one or more transactions prepared by replaying one or more redo logs to be committed. A commit log is allocated to each queue affected by the associated transaction.

Replaying transaction logs 620 from the primary database system by the processors of the backup system cause transactions, previously executed upon the primary system, to be reflected in the backup database system. Changes to the backup database system, caused by replaying transaction logs 620, should mirror changes to the primary system. Thus, if a transaction modifies the in-memory database held in main memory of the primary system 535, and one or more persistent records in the persistent layer of the primary 565 the secondary system should also be modified accordingly. This occurs upon replaying of the associated transaction logs by the secondary system 510. Replay of the transaction logs update the in-memory database held in main memory 540 of the backup system 510 and the persistent records in persistence layer 570 in the same manner as in the primary database system.

FIG. 7 is a flow chart 700 depicting exemplary operations of a system or method executing a write transaction upon a database for use in connection with the current subject matter. At operation 710, a query is received by a primary database including one or more write transactions for execution upon the primary database. A transaction consists of one or more statements for execution upon a database that update, create or modify data within the database. At operation 720, a database system prepares the transactions. In embodiments, during preparation of a transaction, the database system generates one or more update version, which are not immediately visible to further queries upon the database. A version may include an image of a database record after execution of a transaction and each version is associated with a transaction control block and a pointer to the associated transaction control. In this way changes are generated without overwriting an existing data entry within the database. The changes reflected in the update versions associated transaction block become visible after committing the transaction.

At operation 730, a database system receives instructions, or is instructed, to commit the transaction. At operation 740 a system timestamp is incremented and a commitID is generated based on the incremented system timestamp. In embodiments the system timestamp is an incremental number; in other embodiments the system timestamp is a processing system internal clock represented in epoch time, and incrementing happens automatically with the passage of time. It will be appreciated that the system timestamp may be any suitable timestamp for uniquely identifying and ordering commit transactions. In one or more embodiments, the system timestamp is referred to as a global commit timestamp. In a HA/DR system having one or more backup databases, each of the primary system and the one or more backup systems will maintain their own system timestamp or GCT. At operation 750, transaction commit logs are generated and are persisted in a persistent state, for example by writing the commit log to a disk volume, such as log volume 585. At operation 760, the transaction control block associated with the committed transaction is updated with the transaction commitID.

FIG. 8 is a flow chart 800 depicting exemplary operations of a system or method executing a read transaction upon a database for use in connection with the current subject matter. At operation 810 a query containing a read transaction is received. At operation 820 the query is assigned a snapshotID based on a database system timestamp, such as the timestamp incremented in operation 740. At operation 830, as the database system determines which database records to return, any update version with a transaction control block having no assigned commitID are ignored. At operation 840 all relevant records to the query and having a commitID less than or equal to the snapshotID are returned. It will be appreciated that alternatively, at operation 740 a commitID, may be assigned and then the system timestamp incremented, in which case at operation 840 the return includes those results that are relevant to the query and having a commitID less than the snapshotID of the query.

Figures 9, 10:
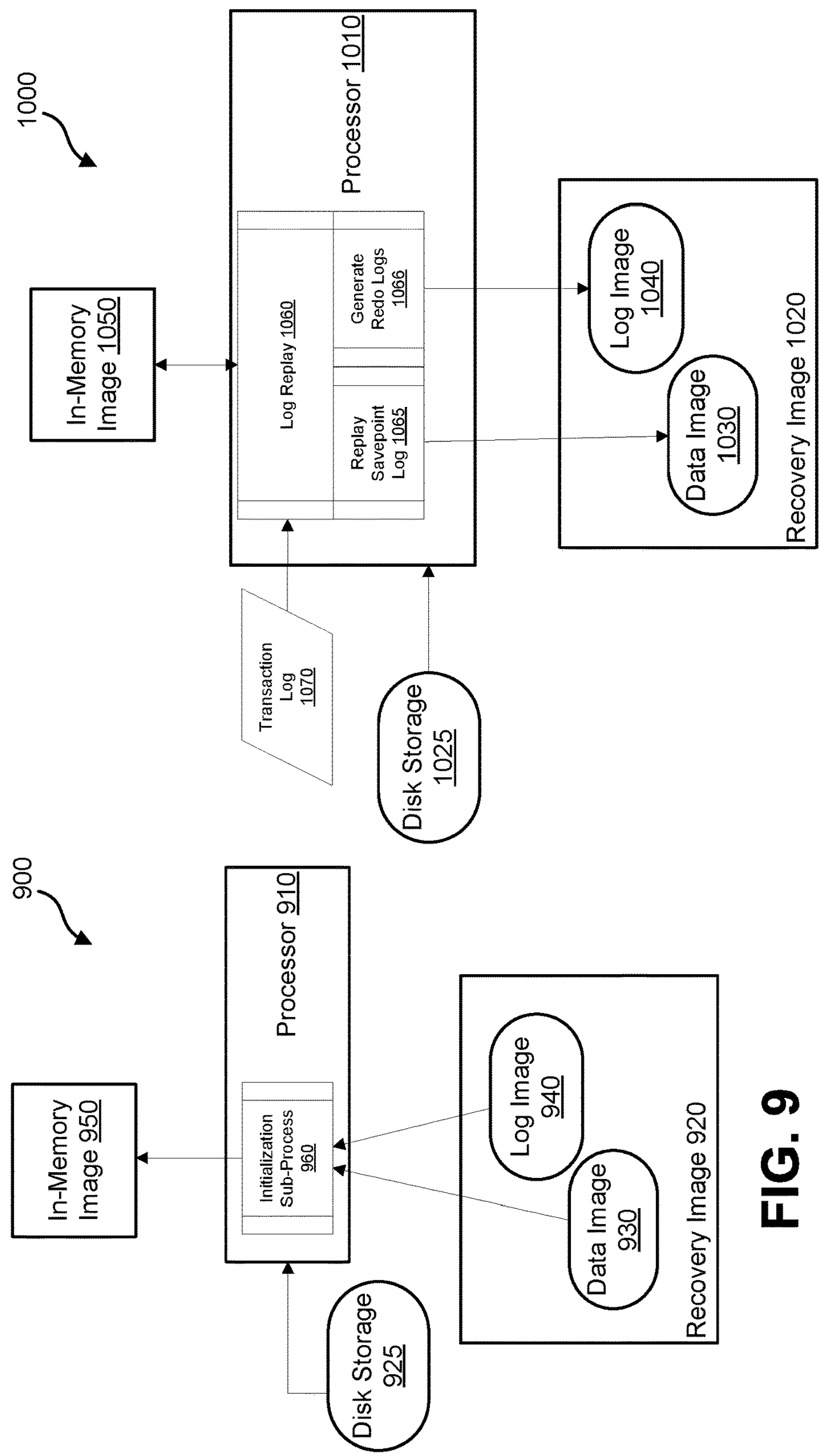
FIG. 9 is a functional flow diagram illustrating one or more aspects of initializing a database for use in accordance with one or more embodiments described herein.
FIG. 10 is a functional flow diagram illustrating one or more aspects of transaction log replay for use in accordance with one or more embodiments described herein.

FIG. 9 is a functional flow diagram 900 illustrating one or more aspects of initializing a database for use in accordance with one or more embodiments described herein. In particular, FIG. 9 depicts the flow of data during initialization of an image of a database held in memory, for example in-memory image 950. The flow of data depicted in FIG. 9 may, for example, be employed during process 610. In particular, one or more processors 910 execute one or more sub-processes such as initialization sub-process 960. Initialization sub-process 960 is retrieved from a persistent storage by processor 910 from a hard disk, or from disk storage 920. Initialization sub-process 960 can be retrieved during a system restart. Such a system restart may be used in the case of planned maintenance or after a disaster occurring at the secondary/backup system such as secondary system 510, which may employ initialization sub-process 960.

The initialization sub-process begins initializing the in-memory image 950 of an in-memory database. This initialization is based on one or more data images residing in data volume 930. Data volume 930 is stored in a persistent data volume as part of a persistence layer or recovery image 920 of a database system such as data volume 580 in persistence layer 570 of secondary system 510. Data volume 930 may include at least the most recent data captured from or stored by a database system's in-memory database during runtime. For example, a savepoint may be generated and stored in a persistent form during database runtime in the normal course of operations. Data stored in a persistent form, or simply persisted, is stored in a form that can survive a system crash, disaster or system restart.

As a system crash, or restart due to planned maintenance, may occur while one or more transactions remain open, it may also be the case that initialization sub-process relies on one or more logs, for example stored in a log volume recovery image 920. That is, based on the persisted data, and persisted transaction logs contained in a recovery image, the in-memory image 950 at the time of a crash is recovered by initialization sub-process 960 executing on processor 910. It will also be appreciated that recovery image 920 may alternatively be separate data images and log images, and may be stored in disparate locations or may be stored locally to processor 910.

FIG. 10 is a functional flow diagram 1000 illustrating one or more aspects of transaction log replay for use in accordance with one or more embodiments described herein. In particular, FIG. 10 depicts the flow of data during normal operations of a backup system implementing a transaction log replay scheme for transaction replication between a primary system, e.g. 505, and a backup system, e.g. 510. One or more processors in a backup database system, for example processor 1010, may receive one or more processes from persistent disk storage, for example a hard drive, or from disk storage 1025. These one or more processes may be, for example, a log replay process 1060 that further interacts with one or more additional processes, for example replay savepoint log sub-process 1065 and generate redo logs sub-process 1066. As will be appreciated, these sub-processes may be a single sub-process or may include one or more additional sub-processes to effectuate the log replay scheme.

During normal operations, when the primary system is operating under normal conditions, and a backup system is providing HA/DR functionality of a primary system by replay of transaction logs, the primary system will execute various transactions in the primary database and accordingly generate transaction logs, such as transaction log 870. A transaction log, such as transaction log 870, may comprise one or more log entries comprising one or more redo log entries, commit log entries, pre-commit log entries, and/or savepoint log entries. Alternatively, a transaction log may be any one of distinct redo logs, commit logs, pre-commit logs, and/or savepoint logs.

In a secondary or backup system, savepoints and transaction logs are generated by the replay of transaction logs received from the primary system. For example, processor 1010 executing instructions comprising log replay sub-process 1060 may receive a transaction log 1070, which may include one or more redo log entries, and one or more commit log entries, and at least one savepoint log entry, each generated by the primary database system. When the processor 1010 replays, by log replay sub-process 1060, a redo log entry or a commit log entry of the transaction log 1070, one or more modifications may be made to one or more records in the in-memory image 1050 of the secondary system. These modifications to the in-memory image 1050 also trigger the processor 1010 to execute generate redo logs sub-process 1066. Generate redo logs sub-process 1066 generates new transaction logs and then modifies the recovery image 1020, for example by storing the new transactions logs in log volume 1040. When the processor 1010 replays a savepoint log entry, this may initiate execution of another sub-process, replay savepoint log sub-process 1065. Replay savepoint log sub-process 1065 may cause the in-memory image 1050 to be captured in an on-disk image, for example data image 1030. In this way, replay savepoint log sub-process 1065 modifies the recovery image 1020.

Figure 11:
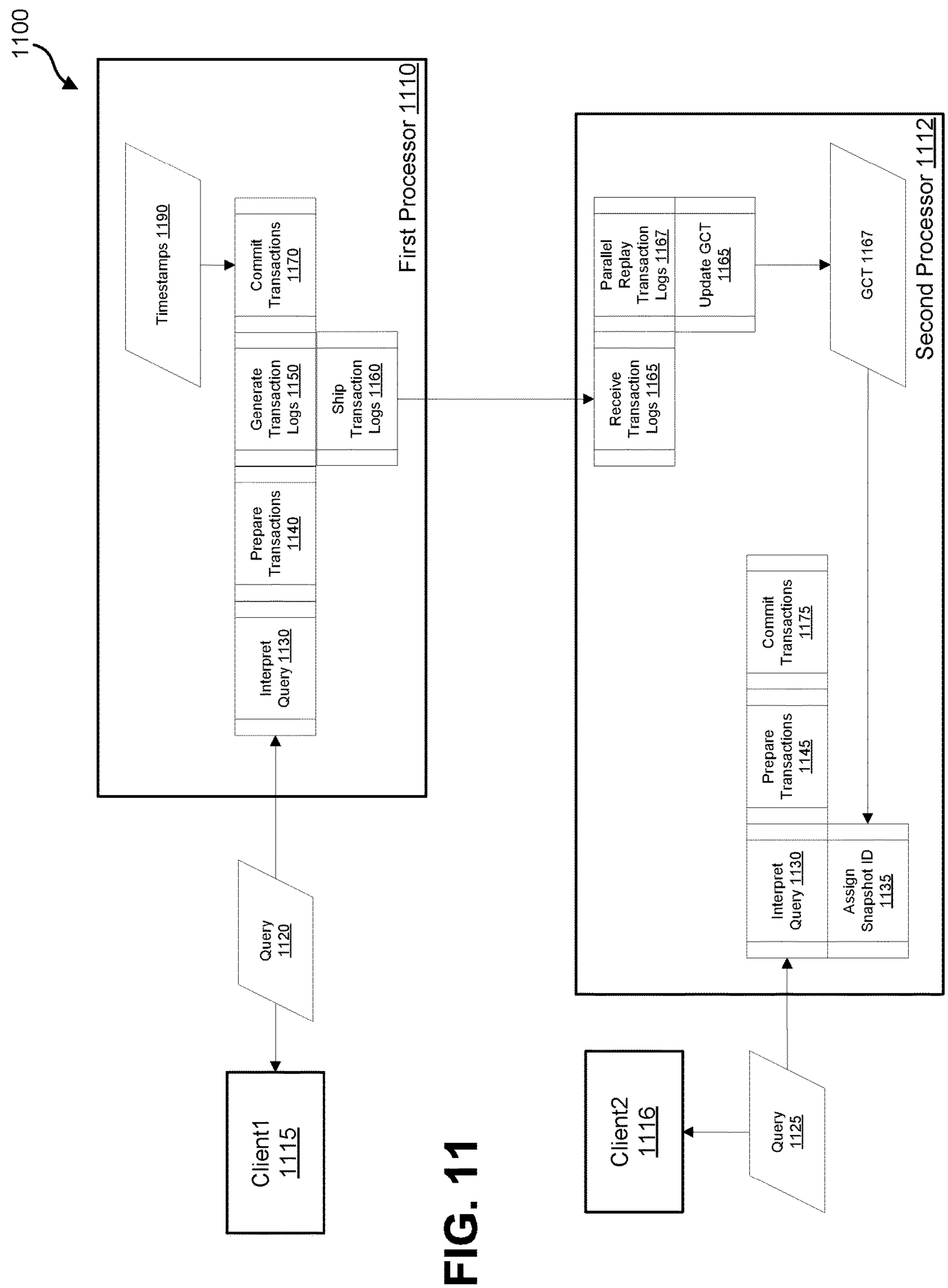
FIG. 11 is a functional flow diagram illustrating one or more processes for maintaining a backup database system of a primary system by transaction log replay in accordance with one or more embodiments described herein.

FIG. 11 is a functional flow diagram 1100 illustrating one or more processes for maintaining a backup database system of a primary system by transaction log replay in accordance with one or more embodiments described herein. In particular, FIG. 11 illustrates the flow of data during operations of a HA/DR system including a first processor 1110, which may be part of a primary database system, and a second processor 1112, which may be part of a backup database system and capable of supporting workload balancing between the primary and backup databases. First processor 1110 may receive a query 1120 from a client 1115. Processor 1110 may then interpret 1130 the query 1120 by preparing necessary SQL statements for execution, and prepare the necessary transactions 1140 including generating update version and transaction control blocks by creating one or more new versions of database records based on the transactions included in query 1120 as interpreted by sub-process 1130.

Prepare transaction sub-process 1140 also receives, or generates, a transaction ID 1180 to associate with the one or more versions, which may be associated in a transaction control block associated with the transaction ID 1180. As prepare transaction sub-process 1140 executes, generate transaction logs sub-process 1150 may cause the processor to generate one or more transaction logs such as pre-commit logs, redo logs, or any other necessary logs. Once processor 1110 is instructed to commit the transaction, commit transaction sub-process 1170 may commit the transaction to the in-memory database and assign the transaction a commit ID, which may be derived from timestamp 1190. Commit transaction sub-process 1170 may also cause generate transaction logs sub-process 1150 to generate a commit log. In embodiments, as transaction logs are generated by sub-process 1150, ship transaction logs sub-process 1160 sends the transaction logs to the second database system, wherein second processor 1112 may execute one or more sub-processes for replaying transaction logs.

In embodiments, one or more processes or policies executed or enforced at a primary system ensure that transactions committed at a primary database become visible in the correct order. These processes or policies operate in real time as queries and transactions are executed on the primary system in the course of operations. But, because a secondary may replicate by transaction log replay, these processes may not apply to a secondary system.

As transaction logs shipped from the primary are received at the primary, they may be persisted at the secondary and replayed at the secondary in order to replicate the transactions executed at the primary. Persisting the transactions first ensures that the transaction logs for transactions replicated at the secondary by replay are available after a crash or restart; but in embodiments, the transaction logs may first be replayed and only then persisted based on system design choices. In embodiments, parallel replay transaction logs sub-process 1167 may cause processor 1112 to replicate the transactions initiated by query 1120 and one or more queries by parallel replay of the resulting transaction logs. In such a way the backup database is populated by the same transactions executed on the primary database. When parallel replay transaction logs 1167 replays a commit log, it causes update GCT sub-process 1165 to update the GCT, or system timestamp, to the most recent commit log entry commit timestamp.

Second processor 1112 may also receive a query 1125 from a client 1116. For exemplary purposes, query 1125 includes a read transaction. Upon receiving query 1125, interpret query sub-process 1130 causes second processor 1112 to prepare one or more SQL statements, and may also obtain a snapshot ID from assign snapshot ID sub-process 1135, which may derive the snapshot ID from the current GCT 1167.

The read transaction executed in response to query 1125 will return all relevant records from the secondary database having a commit timestamp less than the snapshot ID assigned to the query by sub-process 1135, where each record's commit timestamp is taken from the commit log entry as generated by the primary database system, and as replayed by replay transaction logs sub-process 1167.

Figure 12:
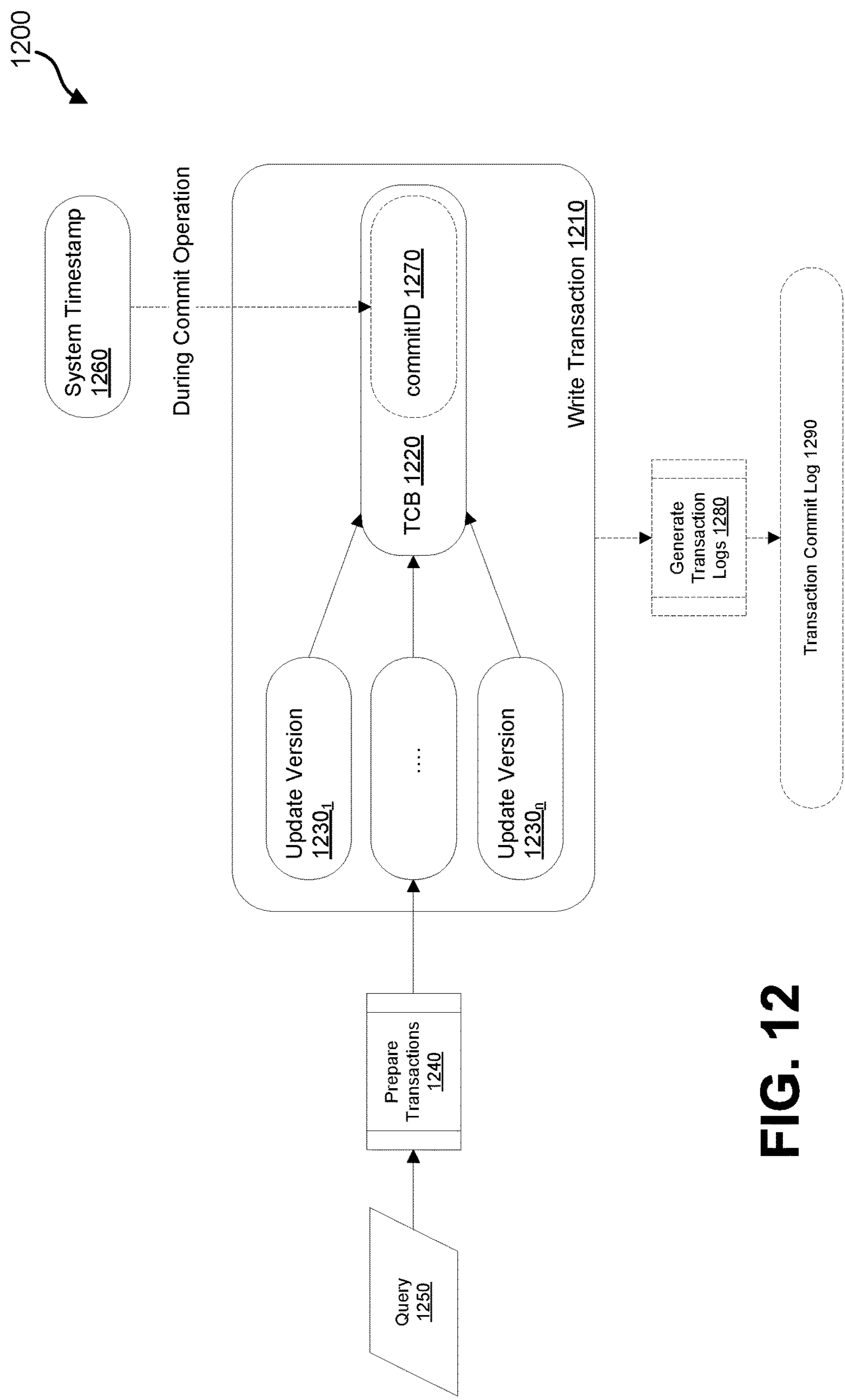
FIG. 12 is a functional flow diagram illustrating a transaction for execution upon a database in accordance with one or more embodiments described herein.

FIG. 12 is a functional flow diagram 1200 illustrating a transaction for execution upon a database in accordance with one or more embodiments described herein. In embodiments, write transaction 1210 are carried out by the creation of one or more update versions $\mathbf{1230}_1$-$\mathbf{1230}_n$ based on the transactions in the query 1250 by prepare transactions process 1240. Each update version $\mathbf{1230}_1$-$\mathbf{1230}_n$ is associated with a transaction control block ("TCB") 1220. Until a transaction is committed, the TCB 1220 does not have an associated commitID. During the operations carried out upon committing a transaction, the system timestamp 1260 is incremented, commitID 1270 is assigned to the associated TCB 1220, and a transaction commit log 1290 is generated by generate transaction log process 1280.

In embodiments, one or more aspects depicted in FIG. 12 are relied upon for determining visibility of a transaction to a read transaction executed upon the database, for example during operation 840. If a TCB 1220 associated with an update version, $\mathbf{1230}_{1\text{-}n}$, does not yet have any commit timestamp value 1270, the update version, $\mathbf{1230}_{1\text{-}n}$, should not be visible to a read transaction. If a TCB 1220 associated with an update version, $\mathbf{1230}_{1\text{-}n}$, has a higher commitID 1270 than an assigned snapshotID 1135, the update version, $\mathbf{1230}_{1\text{-}n}$, should not be visible to a read transaction. Otherwise, the update version, $\mathbf{1230}_{1\text{-}n}$, should be visible to a read transaction executed upon the database.

FIG. 13 is a functional flow diagram 1300 illustrating parallel log replay in accordance with one or more embodiments described herein. In embodiments, as transaction logs are shipped from a primary system 1310 and received at the backup system, the transaction logs are allocated, or dispatched, to a plurality of replay queues 1331, 1332, 1333 by the replay coordinator 1320. The allocation of the transaction logs by replay coordinator 1320 is based on a predefined policy. For example, the transaction logs may be allocated based on which table is to be updated by the relevant log entries. Log replay coordinator 1320 may first read each log and allocate the log to a replay queue based on the policy. According to one or more embodiments, a transaction log includes updates to different database tables or records in one or more log entries, and replay coordinator 1320 allocates individual log entries to the plurality of log replay queues. As transaction logs are replayed in parallel by log replayers 1341, 1342, 1343, the log replayers replicate the transactions contained in the transaction logs into the in-memory database.

In embodiments, the log replayers may also modify or update one or more persistent images. Each log entry should include the transaction ID of the transaction that generated the transaction log. When the transaction log is a commit log, the log should also include the transaction commitID assigned, for example during operation 760. Logs may be persisted first upon receipt, before any transactions are executed upon the in-memory database, and preferably before any transaction is committed to the in-memory database. Otherwise, once-visible data in the backup database may not be visible after a failover and/or restart (which would violate the concept of visibility monotonicity as described above).

In embodiments, when a log entry is replayed at the secondary, a transaction instance, which may be of the same form as write transaction 1210, is created having an associated transaction ID based on the transaction ID of the transaction that generated the transaction log in the primary system. When a commit log is replayed by the secondary system, the secondary system timestamp may also be updated with the commit timestamp value stored in the commit log entry and then the TCB of the replayed transaction is assigned the commitID contained in the associated commit log.

In embodiments, read queries executed on the secondary, such as query 1360, are subject to the same visibility rules described above. Query 1360 may be received by a backup database during the course of replaying one or more transactions. As illustrated, assume query 1360 is received by the backup system just between the replay of transaction T4 log 1360 and transaction T4 commit log 1361. As depicted, one or more transactions, or portions of transactions, have yet to be committed in one or more replay queues. By the time query 1360 is executed, for example, replay queue 1331 will have replayed a portion of transaction T1 and also replayed the T1 commit log.

This issue may be compounded by how transaction logs are generated at the primary. A redo log may be generated for each update version, and upon redo log generation, it is shipped to the backup for replay. In embodiments, in a primary system, there is no exclusive execution boundary across the commit timestamp assignment and the commit log writing operations and thus the commit processing of two transactions can be interleaved as shown in FIG. 15.

Figures 14, 15:
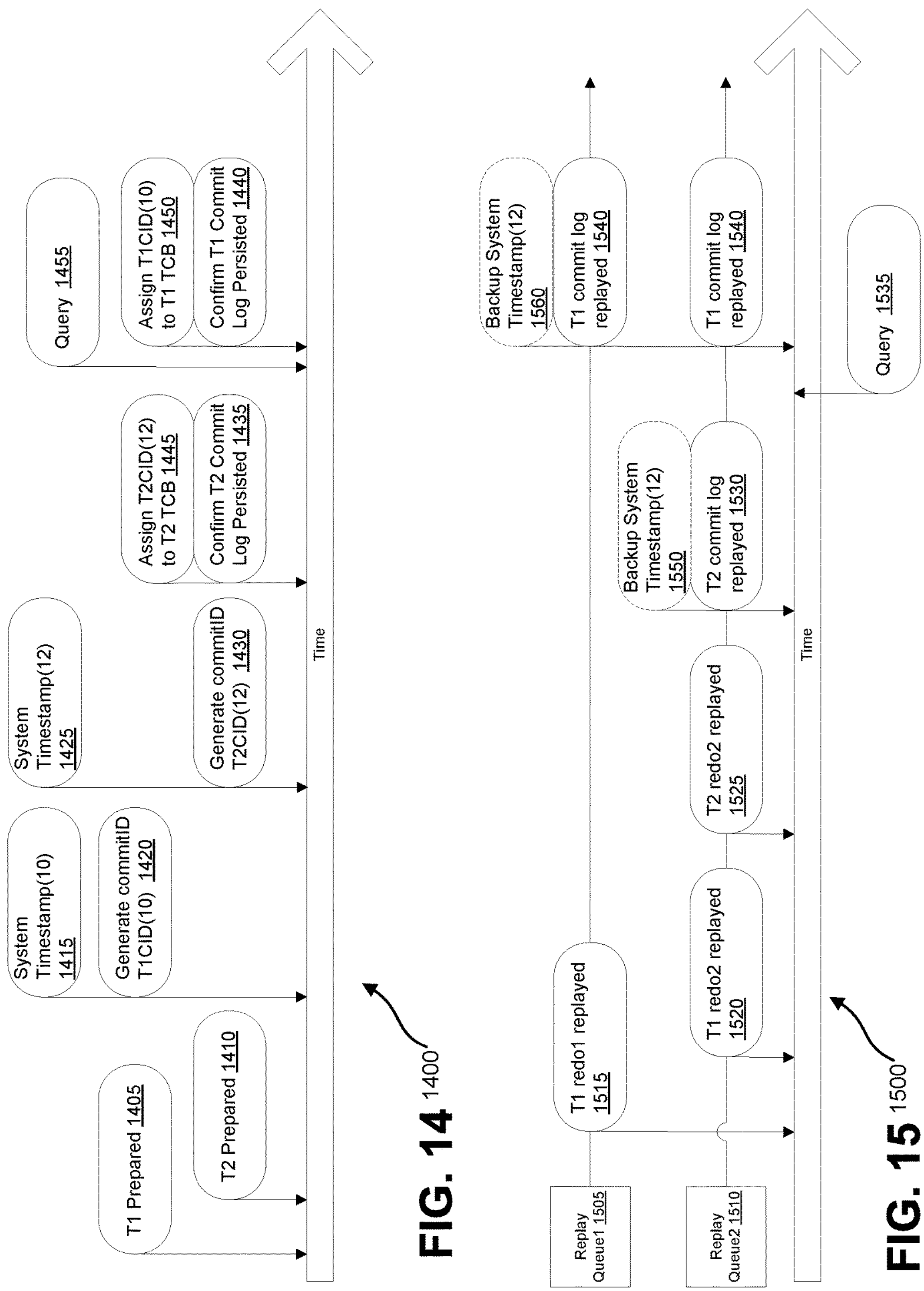
FIG. 14 illustrates a timeline of events caused by transactions executed in a primary database in accordance with one or more embodiments described herein.
FIG. 15 illustrates a timeline of events caused by parallel replay of transaction logs in accordance with one or more embodiments described herein.

FIGS. 14 and 15 illustrate how transactional inconsistency may arise based on parallel log replay. FIG. 14 illustrates a timeline 1400 of events caused by transactions executed in a primary database system in accordance with one or more embodiments described herein. In embodiments, in a primary database one or more processes operate to ensure the proper visibility of transactions in the proper order and that transaction update visibility is correct for a query 1455. First, transaction T1 is received and prepared 1405, then transaction T2 is received and prepared 1410. Upon committing transaction T1 1420, the system timestamp, or GCT, is updated 1415 to take the value of "10", and a commit ID, ("CID") is generated for T1 based on the updated GCT, that is T1 CID(10), and the TCB for T1 is marked as in doubt until writing of T1 commit log is verified. In embodiments applications or system processes can determine the visibility of an in doubt transaction as needed. Then upon committing transaction T2 1430, the system timestamp is updated 1425 to take the value of 12 and a CID is generated for T2, T2 CID(12) 1430. Subsequently, after the log generation for T2 is complete and confirmed 1435, the TCB for T2 is updated to remove any doubt status.

FIG. 15 illustrates a timeline of events caused by parallel replay of transaction logs in accordance with one or more embodiments described herein. Replay queue1 1505 and replay queue2 1510 each replay transactions in parallel. First replay queue1 1505 replays redo1 log for transaction T1 . Before replay of T1 commit log, making the associated update version visible, replay queue2 1510 replays T1 redo2 log 1520, and also replays T2 redo2 1525 and T2 commit log 1530. Replay of T2 commit log 1530 causes an update to the backup system timestamp 1550 causing, for example, the system timestamp to take the value of T2 CID(12). Also, before replay of T1 commit log, query 1535 is executed upon the secondary database, which can return updated versions associated with T2 , but initially update versions associated with T1 are not visible. Once T1 commit log is replayed 1540 (which does not affect the system timestamp at 1560 because T1 CID<12 in this example), the updates caused by T1 will suddenly be visible to query 1535, which violates the visibility stability property described above.

Furthermore, in embodiments, the policy for allocating transaction logs is defined to avoid synchronizing the replay of transactions to enforce the ordering they occurred in a primary system, which would degrade the performance of the overall replay scheme. Allocating transaction logs to parallel replay queues by table is one such policy. One side effect of such unsynchronized log replay is that among transactions having no overlapping tables, there is no guarantee that ordering of transactions is preserved during parallel log replay. Solutions to provide transactional consistency are discussed herein.

A solution to provide transactional consistency in a backup system during parallel replay of transaction logs from a primary system is the chunk-wise updating of the backup system GCT or system timestamp. A chunk, or chunk of logs, is a group of one or more logs received over a period of time. A chunk is defined by a backup system according to a predefined policy, which may be based on an elapse of time, or based on a number of transaction logs, or based on an evaluation of the processing time required to replay one or more logs, or based on any suitable measure for defining the size of a chunk. To enable chunk-wise replay of transaction logs, one or more changes to the generation and processing of transaction logs are utilized.

Figures 16, 17:
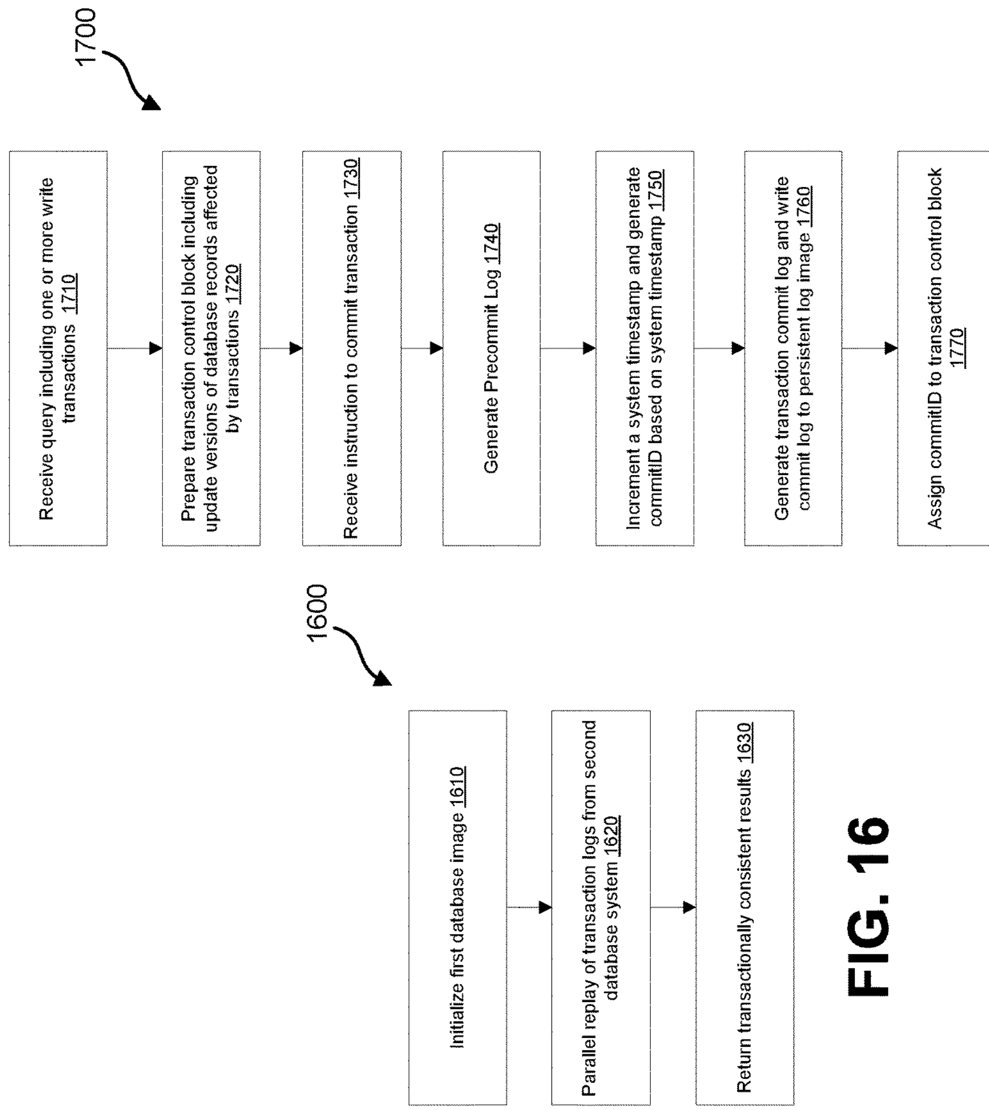
FIG. 16 is a flow chart depicting exemplary operations of a system or method for parallel replay of transaction logs by a database and providing transactionally consistent returns for use in connection with the current subject matter.
FIG. 17 is a flow chart depicting exemplary operations of a system or method for executing a transaction in a database system for use in connection with the current subject matter.

FIG. 16 is a flow chart 1600 depicting exemplary operations of a system or method for parallel replay of transaction logs by a database and providing transactionally consistent returns for use in connection with the current subject matter. Similar to the operations illustrated in FIG. 6, a first database image is initialized during operation 1610. The first database image may be an in-memory image of a backup database. At operation 1620, parallel replay of transaction logs from a second database is performed to maintain a current state. At operation 1630, transactionally consistent results are returned to one or more queries.

In embodiments, providing transactionally consistent results by a database populated by the parallel replay of transaction logs the operation of both the primary database system and the secondary database system are adapted. First, a new log type may provided by the first database, which when replayed by a second database causes new behavior. In embodiments, the new log type is referred to as a precommit log, to indicate that it is a log that is generated after a transaction execution, but before a transaction is committed. In embodiments, the precommit log is generated before a commitID or commit timestamp is generated for a particular transaction. When a replayer at a second database replays the precommit log, it makes record of the transaction's precommit state and then makes a determination regarding the visibility of one or more transactions based on the precommit record and based on when the transactions commit log is replayed.

FIG. 17 is a flow chart depicting exemplary operations of a system or method for executing a transaction in a database system for use in connection with the current subject matter. In embodiments, the operations of FIG. 17 are performed in order to enable transactionally consistent parallel log replay At operation 1710, a query including one or more write transactions is received. At operation 1720, the transactions are prepared by the primary database system, including the generation of update versions of database records affected by the transactions. At operation 1730, the primary database system is instructed to commit the transaction. At operation 1740, a precommit ID is generated and a precommit ID log is generated including the precommit ID. The precommit ID may be based on the primary system timestamp, or primary GCT, similar to a transaction commitID. As with any other transaction log, the precommit log is shipped to the backup database for replay. At operation 1750, the GCT is updated or incremented, and a commitID is generated and associated with the transaction. At operation 1760 a transaction commit log is generated and written to a persistent log volume. At operation 1770, the TCB of the transaction is updated with the commitID.

Figures 18, 19:
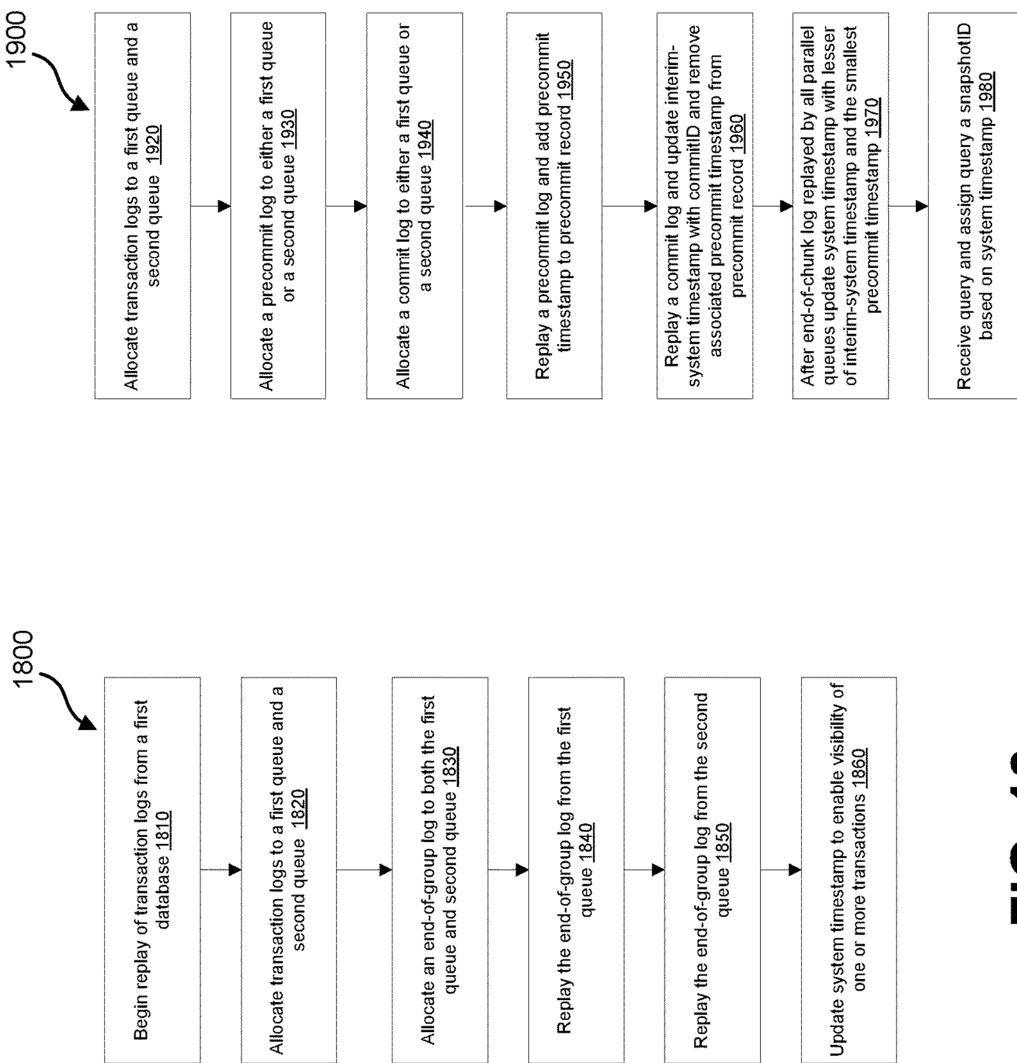
FIG. 18 is a flow chart depicting exemplary operations of a system or method for chunk-wise parallel replay of transaction logs by a database for use in connection with the current subject matter.
FIG. 19 is a flow chart depicting exemplary operations of a system or method for updating a system timestamp based on chunk-wise parallel replay of transaction logs by a database for use in connection with the current subject matter.

FIG. 18 is a flow chart 1800 depicting exemplary operations of a system or method for chunk-wise parallel replay of transaction logs by a database for use in connection with the current subject matter. In embodiments, the operations FIG. 18 are performed to enable chunk-wise parallel replay. A database system may delineate the transition between one chunk, or group, of transactions and the next as it receives transaction logs in any suitable manner. For example, a database may determine that a group size of 10 transaction logs will form a chunk. Once the system has received a complete group of 10 transaction logs it will allocate each transaction update to the appropriate replay queue for reply.

By performing chunk-wise replay, the system timestamp may be updated at the end of the replay of a group of transactions, instead of updating the system timestamp with the replay of every commit log. In this way the system timestamp is updated on a periodic basis, where the period is defined by the size of the chunk, or group of logs. As the time necessary to replay each transaction log replay differs, the period may differ in time for a given group, or chunk, size. The result is that transactions replayed at the secondary become visible in groups, instead of on an individual basis as a commit log is replayed. Replay of a chunk, or group, is identified by appending a new log type, or log entry, to each replay queue in the system. This log entry may be referred to as the end-of-group log entry. When the end-of-group log entry is replayed, it causes the log replay processes to update the system timestamp, and then begin replay of another group, or chunk, of transaction logs. In embodiments, the logs are allocated to queues as they are received and when the system determines that a group is complete it appends the new log entry to each replay queue, and then immediately begins allocating a second chunk to the queue.

At operation 1810, a database system begins replay of transaction logs from a first database system. In embodiments the transaction logs are from a primary database and the replay is performed by a backup database system. At operation 1820, as the transaction logs are received from the first database, they are allocated to one or more replay queues. In embodiments, they are allocated to a first queue and a second queue. At operation 1830, an end-of-group log, or end-of-chunk log entry, is allocated to each queue. As transaction logs are replayed from the queues, eventually the next log in a queue is the end-of-group log. In embodiments, the end-of-group log is generated by the backup database system to define the end of a chunk. At operation 1840 the end-of-group log in the first queue is replayed. In embodiments playing an end-of-group log causes log replayer to inform one or more system processes that the end of the respective group of logs has been reached. In embodiments, the log replayer returns a value or data object to the log replay coordinator. In other embodiments, the log replayer asserts a signal, or generates a signal, indicating that it has reached an end of chunk. Alternatively the log replayer informs parallel replay transaction logs process 1167, or the update GCT process 1165, that it has replayed the end of group log by providing return to the respective process 1165, 1167. Alternatively the log replayer asserts a flag, or employs any suitable measure to inform the system that the group of logs allocated to the respective queue has been replayed. At operation 1850 the end-of-group log in the second queue is replayed and the system is updated in recognition that the second queue has completed replay of its queued portion of transaction logs from the group. In embodiments there may be more replay queues, in which case each queue is allocated an end-of-group log to delineate between one chunk and the next.

When all end-of-group log entries have been replayed from each of the many queues, the system recognizes that all transactions within the group have been replayed from each queue and at operation 1860, the backup database system will update its system timestamp, when all transaction logs within a respective group or chunk have been replayed. In embodiment, log replay from a particular queue that has reached a respective end-of-group log entry will halt until the next chunk begins. In other embodiments, log replay from a queue that has reached the end of a group of transaction will continue replay into the next group of transactions regardless of the status of the other queues.

FIG. 19 is a flow chart 1900 depicting exemplary operations of a system or method for updating a system timestamp based on chunk-wise parallel replay of transaction logs by a database for use in connection with the current subject matter. In embodiments, the operations described in FIG. 19 are performed by a database system performing parallel log replay from a second database, after the second database has generated a precommit log. The database system performing the operations of FIG. 19 relies upon a record of all precommit logs replayed by the database system and an interim-system timestamp, which is a timestamp updated during the replay of a particular chunk, or group, of transactions. At the end of the replay of the chunk or group of transactions, the main system timestamp is updated, thereby making one or more replayed transactions visible to a read transaction executed upon the database system. Thus, queries received by the database system are assigned a snapshotID based on the updated system timestamp.

At operation 1920, transaction logs are allocated to a first queue and a second queue. At operation 1930, a precommit log is allocated to either a first queue or a second queue. At operation 1940, a commit log is allocated to either a first queue or a second queue. At operation 1950, a precommit log is replayed and a precommit timestamp is added to a precommit record. At operation 1960, a commit log is replayed and an interim-system timestamp is updated with the value of the commitID, and an associated precommit timestamp is removed from the precommit record. At operation 1970, after each end-of-group log has been replayed from each queue indicating that all logs within a chunk have been replayed, the system timestamp is updated with the lesser of (1) the current inter-system timestamp and (2) the smallest precommit timestamp. At operation 1980, a query is received and assigned a snapshotID based on the system timestamp. Thereby, the query received at operation 1980 is returned consistent results relevant to the query.

Figure 20:
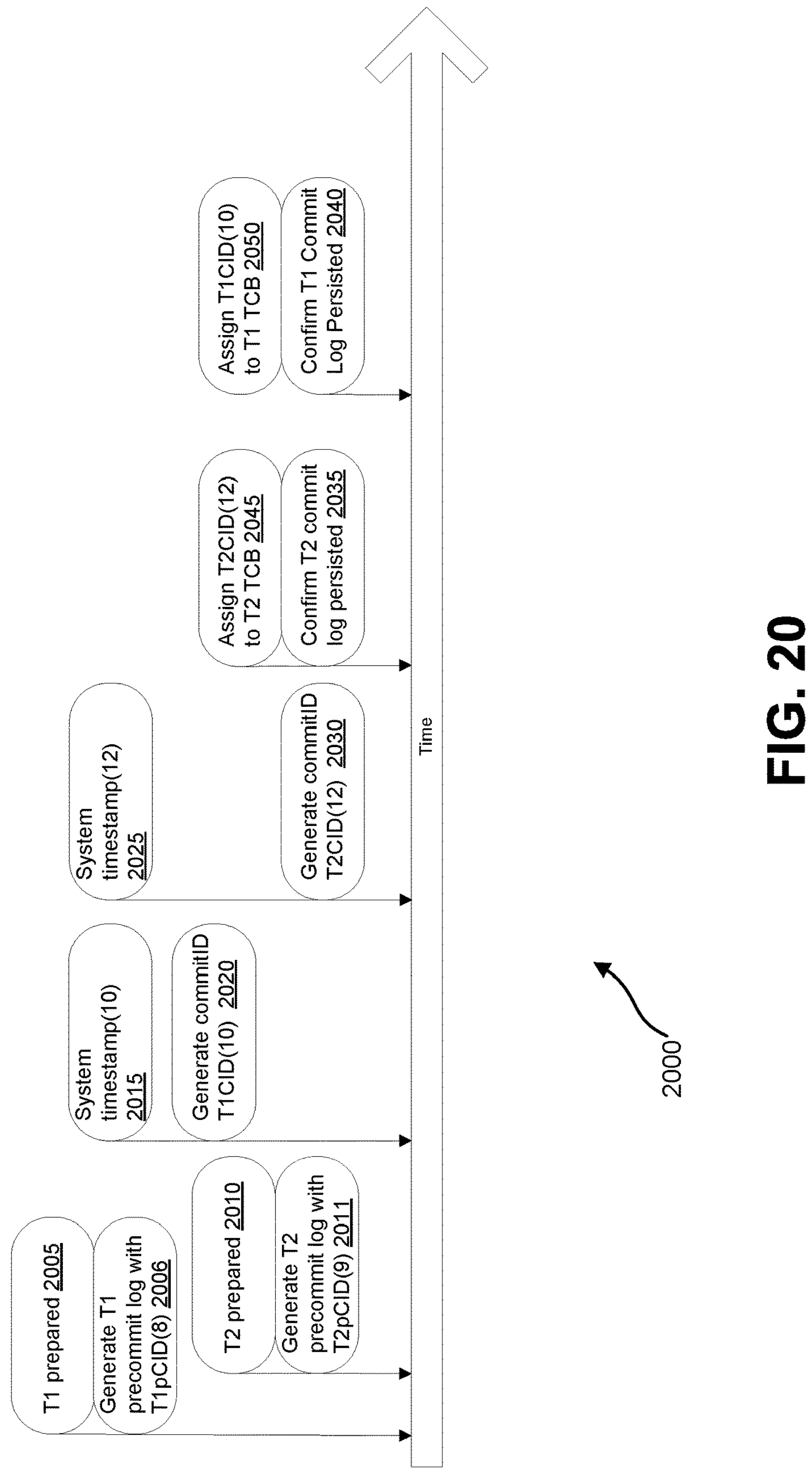
FIG. 20 illustrates a timeline of events caused by transactions executed in a primary database in accordance with one or more embodiments described herein.

FIG. 20 illustrates a timeline of events caused by transactions executed in a primary database in accordance with one or more embodiments described herein. In particular, FIG. 20 illustrates the generation of a precommit timestamp during the courts of executing transactions which is performed in various embodiments. A first transaction T1 is prepared 2005 and an associated precommit is generated 2006 including a precommit timestamp T1 pCID( ) is generated with a value of 8 for exemplary purposes. As depicted the precommit log is generated immediately after T1 is prepared. In embodiments, precommit log is not generated until sometime after T1 is prepared but before a commitID is generated for the particular transaction. In some embodiments, T1 is prepared when the system receives instructions to commit T1.

After some time, transaction T2 is prepared 2010 and similar to T1 , a precommit log T2 is generated having a precommit ID, T2 pCID( ), which takes a value of 9 for exemplary purposes. As with T1 , the precommit log associated with T2 need not be generated immediately after preparation of T2 , but may be generated sometime after, but before the commitID for T2 is generated.

After some time, a commitID, T1 CID( ), is generated 2020 for T1 causing the primary system to update its system timestamp 2015 to 10, and T1 CID( ) takes the value 10. Sometime later, a commitID, T2 CID( ), is generated 2030 for T2 causing the primary system to update its system timestamp 2025 to 12, and T1 CID( ) takes the value 12. Sometime later a commit log associated with T2 is generated and persisted 2035 to persistent storage and transaction T2 is updated with the assigned T2 CID(12) 2045. Sometime later a commit log associated with T1 is generated and persisted 2040 to persistent storage and transaction T2 is updated with the assigned T2 CID(12) 2045. In embodiments, the logs associated with the various transactions depicted in FIG. 20 are shipped to the backup database as they are created, and they are replayed by the processes at the backup database.

FIG. 21 illustrates a timeline of events caused by parallel replay of transaction logs in accordance with one or more embodiments described herein. In particular, FIG. 21 depicts, for exemplary purpose, the effects of replaying various logs generated in the processes depicted in FIG. 12. The illustrated processes begin after the interim-system timestamp has been updated 2105, for example to a value of 7, which may have been caused by the replay of a commit logs. Sometime later, a redo log associated with T1 is replayed 2110. Sometime later the precommit log associated with T1 is replayed 2115 and T1 pCID(8) is added to a precommit record. Sometime later a redo log associated with T2 is replayed 2125. Subsequently, a precommit log associated with T2 is replayed 2130, and T2 pCID(9) is added to the precommit record. Sometime later a commit log associated with T2 is replayed 2140 and two things happen: T2 pCID(9) is removed from the precommit record 2145, and the system's interim-system timestamp is updated based on T2 CID(10) 2150. Sometime later an end-of-group log is replayed by each of the replay queues 2155 causing the system to update its system-timestamp 2160. In embodiments the update system timestamp does so based on the least of the lowest timestamp on the precommit record and the value of the interim-system timestamp, e.g. min{min{timestamps on precommit record}, interim-system timestamp}}. In this example, assuming that the precommit record was empty at 2105, the system timestamp takes T1 pCID(8), which is the only value on the precommit record, and because T1 pCID(8)<interim-system timestamp (T2 CID(12)). As this point, neither T2 nor T1 is visible, because even though T2 is committed in the secondary, T1 which was committed before T2 in the primary system, has not yet been committed in the backup system; thus the consistency of the transactions is preserved.

Subsequently, a commit log associated with T1 is replayed 2165 and T1 pCID(8) is removed from the precommit log 2170 while the interim-system timestamp is unaffected 2175 because T1 CID(10)<interim-system timestamp(T2 CID(12)). Then, when the next end-of-group log is replayed sometime later 2180, the system time stamp is updated 2185 to reflect the interim-system timestamp value of "12," because, in this example, there are no longer any records on the precommit log. After system timestamp is updated 2185 both T1 and T2 are visible to query executed on the backup database, and consistency is preserved.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases “at least one of A and B;” “one or more of A and B;” and “A and/or B” are each intended to mean “A alone, B alone, or A and B together.” A similar interpretation is also intended for lists including three or more items. For example, the phrases “at least one of A, B, and C;” “one or more of A, B, and C;” and “A, B, and/or C” are each intended to mean “A alone, B alone, C alone, A and B together, A and C together, B and C together, or A and B and C together.” In addition, use of the term “based on,” above and in the claims is intended to mean, “based at least in part on,” such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:

receiving a first group of transaction logs from a first database, wherein the first group of transaction logs comprises (i) a pre-commit log containing data having one or more pre-commit time stamps assigned to the one or more write transactions or (ii) a commit log containing data comprising a commit timestamp indicating when at least one of the one or more transactions was committed to the first database;

allocating one or more transaction logs from the first group of transaction logs to a first queue;

allocating one or more transaction logs from the first group of transaction logs to a second queue;

generating an end-of-group transaction log indicative of an end of the first group of transaction logs;

allocating the end-of-group log to the first queue and the second queue;

replaying one or more transaction logs from the first queue including the end-of-group transaction log allocated to the first queue;

replaying one or more transaction logs from the second queue including the end-of-group transaction log allocated to the second queue;

changing visibility of one or more transactions in response to replaying the end-of-group transaction log allocated to the first queue and the end-of-group transaction log allocated to the second queue;

replaying the pre-commit log, wherein replaying the pre-commit log causes at least one pre-commit timestamp to be recorded in a pre-commit timestamp record;

replaying the commit log, wherein replaying the commit log causes at least one associated pre-commit timestamp to be removed from the pre-commit timestamp record; and when a commit timestamp of the commit log is greater than an interim-system timestamp, updating the interim-system timestamp with the commit timestamp.

2. The computer implemented method of claim 1, wherein the first group of transaction logs further comprises:

a redo log containing data describing one or more write transactions executed in the first database.

3. The computer implemented method of claim 1, wherein changing visibility of one or more transactions comprises:

updating a system timestamp to match the lower of a lowest pre-commit timestamp recorded in the pre-commit timestamp record and the interim-system timestamp.

4. The computer implemented method of claim 3 further comprising:

receiving a query; and returning, in response to the query, only visible database records, wherein visible database records have an associated commit timestamp less than or equal to the system timestamp.

5. The computer implemented method of claim 1, wherein the one or more transaction logs are allocated according to an allocation policy based on one or more tables affected by the replay of each respective log.

6. The computer implemented method of claim 1, further comprising:

receiving a second group of transaction logs;

after allocating the end-of-group log to the first queue and the second queue, allocating one or more transaction logs from the second group of transaction logs to a first queue;

allocating one or more transaction logs from the second group of transaction logs to a second queue;

generating a second end-of-group transaction log indicative of an end of the second group of transaction logs; and allocating the second end-of-group log to the first queue and the second queue.

7. A system comprising:

at least one processor; and a non-transitory computer readable media having computer executable instructions stored therein, which, when executed by the processor, causes the system to perform operations comprising:

receiving a first group of transaction logs from a first database, wherein the first group of transaction logs comprises (i) a pre-commit log containing data having one or more pre-commit time stamps assigned to the one or more write transactions or (ii) a commit log containing data comprising a commit timestamp indicating when at least one of the one or more transactions was committed to the first database;

allocating one or more transaction logs from the first group of transaction logs to a first queue;

allocating one or more transaction logs from the first group of transaction logs to a second queue;

generating an end-of-group transaction log indicative of an end of the first group of transaction logs;

allocating the end-of-group log to the first queue and the second queue;

replaying one or more transaction logs from the first queue including the end-of-group transaction log allocated to the first queue;

replaying one or more transaction logs from the second queue including the end-of-group transaction log allocated to the second queue;

changing visibility of one or more transactions in response to replaying the end-of-group transaction log allocated to the first queue and the end-of-group transaction log allocated to the second queue;

replaying the pre-commit log, wherein replaying the pre-commit log causes at least one pre-commit timestamp to be recorded in a pre-commit timestamp record;

replaying the commit log, wherein replaying the commit log causes at least one associated pre-commit timestamp to be removed from the pre-commit timestamp record; and when a commit timestamp of the commit log is greater than an interim-system timestamp, updating the interim-system timestamp with the commit timestamp.

8. The system of claim 7, wherein the first group of transaction logs further comprises:

a redo log containing data describing one or more write transactions executed in the first database.

9. The system of claim 7, wherein changing visibility of one or more transactions comprises:

updating a system timestamp to match the lower of a lowest pre-commit timestamp recorded in the pre-commit timestamp record and the interim-system timestamp.

10. The system of claim 9, wherein the operations further comprise:

receiving a query; and returning, in response to the query, only visible database records, wherein visible database records have an associated commit timestamp less than or equal to the system timestamp.

11. The system of claim 7, wherein the one or more transaction logs are allocated according to an allocation policy based on a transaction identification associated with each respective log, the transaction identification being uniquely assigned to each respective log by the first database; or the allocation policy is based on one or more tables affected by the replay of each respective log.

12. The system of claim 7, wherein the operations further comprise:

receiving a second group of transaction logs;

after allocating the end-of-group log to the first queue and the second queue, allocating one or more transaction logs from the second group of transaction logs to a first queue;

allocating one or more transaction logs from the second group of transaction logs to a second queue;

generating a second end-of-group transaction log indicative of an end of the second group of transaction logs; and allocating the second end-of-group log to the first queue and the second queue.

13. A non-transitory computer readable storage medium embodying programming instructions for performing a method, the method comprising:

allocating one or more transaction logs from a first group of transaction logs to a first queue, wherein the first group of transaction logs comprises (i) a pre-commit log containing data having one or more pre-commit time stamps assigned to the one or more write transactions or (ii) a commit log containing data comprising a commit timestamp indicating when at least one of the one or more transactions was committed to the first database;

allocating one or more transaction logs from the first group of transaction logs to a second queue;

generating an end-of-group transaction log indicative of an end of the first group of transaction logs;

allocating the end-of-group log to the first queue and the second queue;

replaying one or more transaction logs from the first queue including the end-of-group transaction log allocated to the first queue;

replaying one or more transaction logs from the second queue including the end-of-group transaction log allocated to the second queue;

changing visibility of one or more transactions in response to replaying the end-of-group transaction log allocated to the first queue and the end-of-group transaction log allocated to the second queue;

replaying the pre-commit log, wherein replaying the pre-commit log causes at least one pre-commit timestamp to be recorded in a pre-commit timestamp record;

replaying the commit log, wherein replaying the commit log causes at least one associated pre-commit timestamp to be removed from the pre-commit timestamp record; and when a commit timestamp of the commit log is greater than an interim-system timestamp, updating the interim-system timestamp with the commit timestamp.

14. The non-transitory computer readable storage medium of claim 13, wherein the first group of transaction logs further comprises:

a redo log containing data describing one or more write transactions executed in the first database.

15. The non-transitory computer readable storage medium of claim 13, wherein changing visibility of one or more transactions comprises:

updating a system timestamp to match the lower of a lowest pre-commit timestamp recorded in the pre-commit timestamp record and the interim-system timestamp.

16. The non-transitory computer readable storage medium of claim 15, the method further comprising:

receiving a query; and returning, in response to the query, only visible database records, wherein visible database records have an associated commit timestamp less than or equal to the system timestamp.

17. The non-transitory computer readable storage medium of claim 13, wherein the one or more transaction logs are allocated according to an allocation policy based on a transaction identification associated with each respective log, the transaction identification being uniquely assigned to each respective log by the first database; or the allocation policy is based on one or more tables affected by the replay of each respective log.

18. The non-transitory computer readable storage medium of claim 13, the method further comprising:

receiving a second group of transaction logs;

after allocating the end-of-group log to the first queue and the second queue, allocating one or more transaction logs from the second group of transaction logs to a first queue;

allocating one or more transaction logs from the second group of transaction logs to a second queue;

generating a second end-of-group transaction log indicative of an end of the second group of transaction logs; and allocating the second end-of-group log to the first queue and the second queue.

19. The computer implemented method of claim 1, wherein the allocating, generating, replaying, and updating are performed by at least one data processor of a secondary server associated with a second database.

20. The system of claim 7, wherein the at least one data processor is part of a secondary server associated with a second database, wherein the first database is associated with a primary server.

21. The non-transitory computer readable storage medium of claim 13, wherein the allocating, generating, replaying, and updating are performed by at least one data processor of a secondary server associated with a second database.

* * * * *